US012214592B2

(12) United States Patent
Mikoshiba et al.

(10) Patent No.: US 12,214,592 B2
(45) Date of Patent: Feb. 4, 2025

(54) LIQUID DISCHARGE APPARATUS AND METHOD OF DRIVING LIQUID DISCHARGE HEAD

(71) Applicant: SEIKO EPSON CORPORATION, Tokyo (JP)

(72) Inventors: Masanori Mikoshiba, Shimosuwa-Machi (JP); Motoki Takabe, Shiojiri (JP); Takanori Aimono, Matsumoto (JP); Jingling Wang, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 18/165,391

(22) Filed: Feb. 7, 2023

(65) Prior Publication Data

US 2023/0249451 A1 Aug. 10, 2023

(30) Foreign Application Priority Data

Feb. 7, 2022 (JP) ................................ 2022-017221

(51) Int. Cl.
*B41J 2/045* (2006.01)
*B41J 2/14* (2006.01)

(52) U.S. Cl.
CPC ....... *B41J 2/04588* (2013.01); *B41J 2/04508* (2013.01); *B41J 2/04581* (2013.01); *B41J 2/14233* (2013.01)

(58) Field of Classification Search
CPC .................................................... B41J 2/04588
See application file for complete search history.

(56) References Cited

U.S. PATENT DOCUMENTS

2014/0267478 A1 9/2014 Yokoyama
2023/0226817 A1* 7/2023 Takabe ................ H10N 30/802 347/10
2023/0249451 A1* 8/2023 Mikoshiba ........... B41J 2/04563 347/14

FOREIGN PATENT DOCUMENTS

JP 2000-025225 A 1/2000
JP 2000-260295 A 9/2000
JP 2014-172342 A 9/2014
JP 2018-012261 A 1/2018

* cited by examiner

*Primary Examiner* — Julian D Huffman
(74) *Attorney, Agent, or Firm* — WORKMAN NYDEGGER

(57) ABSTRACT

A liquid discharge apparatus includes a diaphragm, a pressure chamber substrate including a partition wall partitioning a pressure chamber communicating with a nozzle discharging liquid, a piezoelectric element including a first active portion that overlaps a center of the pressure chamber and a second active portion that overlaps the pressure chamber at a position closer to an outer edge of the pressure chamber than the first active portion, and a drive signal generation portion that generates a discharge signal for discharging the liquid by being supplied to one of the first active portion and the second active portion and a correction signal that is supplied to the other of the first active portion and the second active portion, in which a potential of the discharge signal changes over time and a potential of the correction signal is constant during a discharge period for discharging the liquid.

14 Claims, 17 Drawing Sheets

LIQUID DISCHARGE APPARATUS AND METHOD OF DRIVING LIQUID DISCHARGE HEAD

The present application is based on, and claims priority from JP Application Ser. No. 2022-017221, filed Feb. 7, 2022, the disclosure of which is hereby incorporated by reference herein in its entirety.

BACKGROUND

1. Technical Field

The present disclosure relates to a liquid discharge apparatus and a method of driving a liquid discharge head.

2. Related Art

A liquid discharge apparatus typified by a piezo-type ink jet printer generally employs a configuration in which a piezoelectric element is disposed on a diaphragm that constitutes a part of a wall surface of a pressure chamber communicating with a nozzle, as disclosed in JP-A-2018-12261, JP-A-2000-260295, and JP-A-2000-25225. Here, liquid such as ink is accommodated in the pressure chamber. By deforming the diaphragm, the piezoelectric element causes the liquid to discharge from the nozzle with expansion or shrinkage of the volume of the pressure chamber.

For example, as disclosed in JP-A-2000-25225, the piezoelectric element of such a liquid discharge apparatus may be divided into an active portion that overlaps a central portion of the pressure chamber and an active portion that overlaps an end portion of the pressure chamber when viewed in the thickness direction of the diaphragm.

However, in the device described in JP-A-2000-25225, the discharge characteristics may change over time due to deterioration of a piezoelectric body, or variations or errors may occur in the discharge characteristics due to manufacturing errors. As a result, there is a problem that good discharge characteristics cannot be stably obtained.

SUMMARY

According to an aspect of the present disclosure, there is provided a liquid discharge apparatus including a diaphragm that has a first surface and a second surface facing in a direction opposite to the first surface, a pressure chamber substrate laminated on the first surface and that includes a partition wall partitioning a pressure chamber communicating with a nozzle discharging liquid, a piezoelectric element that includes a first active portion laminated on the second surface and that overlaps a center of the pressure chamber when viewed in a thickness direction of the diaphragm and a second active portion that overlaps the pressure chamber at a position closer to an outer edge of the pressure chamber than the first active portion, and a drive signal generation portion that generates a discharge signal discharging liquid from the nozzle by being supplied to one of the first active portion and the second active portion and a correction signal that is supplied to the other of the first active portion and the second active portion, in which a potential of the discharge signal changes over time and a potential of the correction signal is constant during a discharge period during which the liquid is discharged from the nozzle.

According to another aspect of the present disclosure, there is provided a method of driving a liquid discharge head that includes a diaphragm that has a first surface and a second surface facing in a direction opposite to the first surface, a pressure chamber substrate laminated on the first surface and that includes a partition wall partitioning a pressure chamber communicating with a nozzle discharging liquid, and a piezoelectric element that includes a first active portion laminated on the second surface and that overlaps a center of the pressure chamber when viewed in a thickness direction of the diaphragm and a second active portion that overlaps the pressure chamber at a position closer to an outer edge of the pressure chamber than the first active portion, the method including supplying a discharge signal discharging liquid from the nozzle to one of the first active portion and the second active portion and supplying a correction signal to the other of the first active portion and the second active portion, and changing a potential of the discharge signal over time, and maintaining a potential of the correction signal constant during a discharge period during which the liquid is discharged from the nozzle.

DESCRIPTION OF EXEMPLARY EMBODIMENTS

Figure 1:
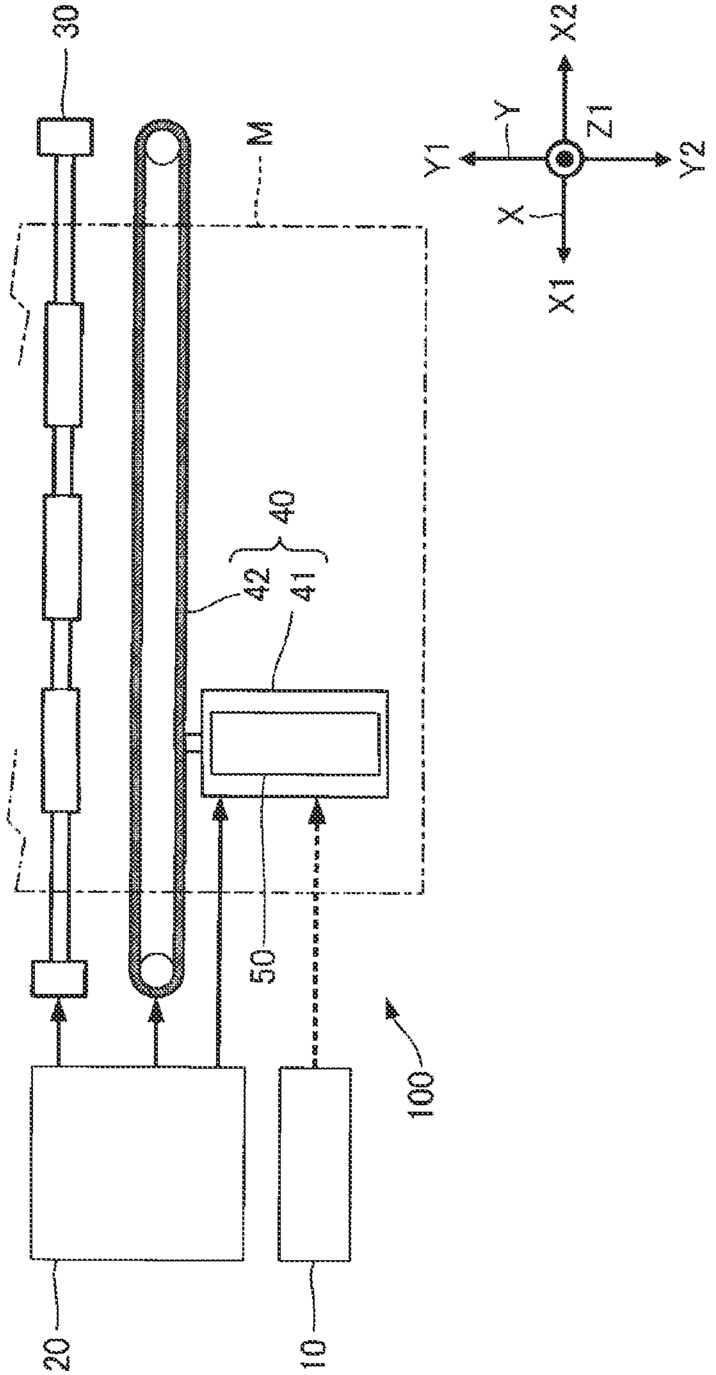
FIG. 1 is a configuration diagram schematically illustrating a liquid discharge apparatus according to a first embodiment.

Hereinafter, preferred embodiments according to the present disclosure will be described with reference to the accompanying drawings. In the drawings, the dimensions and scale of each portion are appropriately different from the actual ones, and some parts are schematically illustrated for easy understanding. In addition, the scope of the present disclosure is not limited to these forms unless it is stated in the following description that the present disclosure is particularly limited.

In the following description, for the sake of convenience, the X axis, Y axis, and Z axis that intersect each other are appropriately used. In addition, in the following, one direction along the X axis is the X1 direction, and the direction opposite to the X1 direction is the X2 direction. Similarly, the directions opposite to each other along the Y axis are the Y1 direction and the Y2 direction. In addition, the directions opposite to each other along the Z axis are the Z1 direction and the Z2 direction. In addition, viewing in a direction along the Z axis may be referred to as "plan view".

Here, typically, the Z axis is a vertical axis, and the Z2 direction corresponds to the downward direction in the vertical direction. However, the Z axis may not be a vertical axis. In addition, the X axis, the Y axis, and the Z axis are typically orthogonal to each other, but are not limited thereto, and may intersect at an angle within a range of, for example, 80° or more and 100° or less.

1. FIRST EMBODIMENT

1-1. Overall Configuration of Liquid Discharge Apparatus

FIG. 1 is a configuration diagram schematically illustrating a liquid discharge apparatus 100 according to a first embodiment. The liquid discharge apparatus 100 is an ink jet printing apparatus that discharges ink, which is an example of liquid, onto a medium M as a droplet. The medium M is a typically printing paper. The medium M is not limited to the printing paper, and may be a printing target of any material such as a resin film or cloth.

As illustrated in FIG. 1, the liquid discharge apparatus 100 includes a liquid container 10, a control unit 20, a transport mechanism 30, a movement mechanism 40, and a liquid discharge head 50.

The liquid container 10 is a container that stores ink. Examples of specific aspects of the liquid container 10 include a cartridge that can be attached to and detached from the liquid discharge apparatus 100, a bag-shaped ink pack made of a flexible film, and an ink tank that can be refilled with ink. The type of ink stored in the liquid container 10 is random.

The control unit 20 includes, for example, a processing circuit such as a central processing unit (CPU) or a field programmable gate array (FPGA) and a storage circuit such as a semiconductor memory, and controls the operation of each element of the liquid discharge apparatus 100.

The transport mechanism 30 transports the medium M in the Y2 direction under the control of the control unit 20. The movement mechanism 40 reciprocates the liquid discharge head 50 in the X1 direction and the X2 direction under the control of the control unit 20. In the example illustrated in FIG. 1, the movement mechanism 40 includes a substantially box-shaped carriage 41 that accommodates the liquid discharge head 50, and an endless transport belt 42 to which the carriage 41 is fixed. The number of liquid discharge heads 50 mounted on the carriage 41 is not limited to one, and may be plural. In addition, the liquid container 10 described above may be mounted on the carriage 41 in addition to the liquid discharge head 50.

Under the control of the control unit 20, the liquid discharge head 50 discharges the ink supplied from the liquid container 10 toward the medium M from each of a plurality of nozzles in the Z2 direction. The discharge is performed in parallel with the transport of the medium M by the transport mechanism 30 and the reciprocating movement of the liquid discharge head 50 by the movement mechanism 40, and thus an image by ink is formed on the surface of the medium M.

1-2. Electrical Configuration of Liquid Discharge Apparatus

Figure 2:
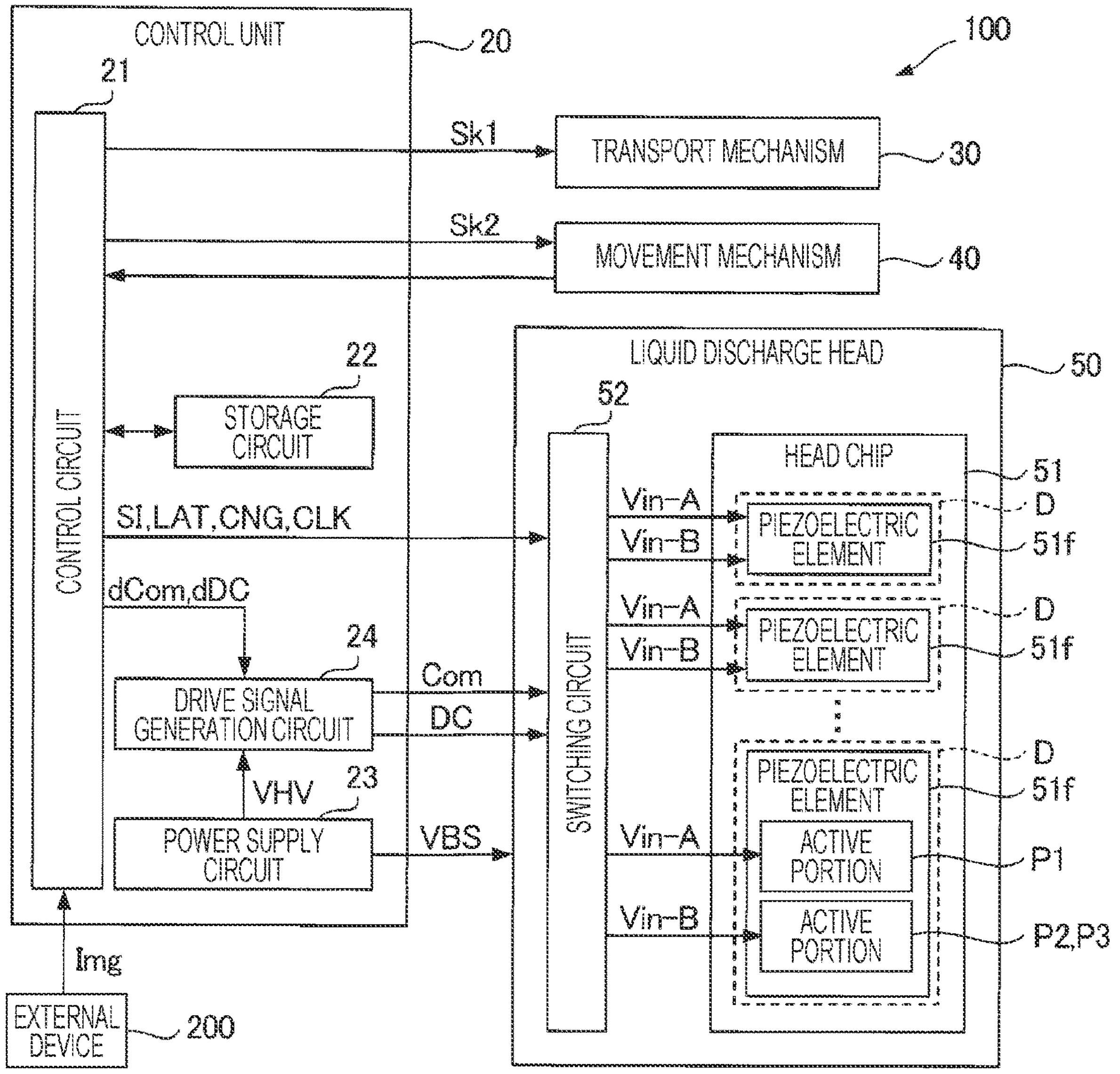
FIG. 2 is a diagram illustrating an electrical configuration of the liquid discharge apparatus according to the first embodiment.

FIG. 2 is a diagram illustrating an electrical configuration of the liquid discharge apparatus 100 according to the first embodiment. Hereinafter, the control unit 20 will be described with reference to FIG. 2, and prior to this, the liquid discharge head 50 will be briefly described.

As illustrated in FIG. 2, the liquid discharge head 50 includes a head chip 51 and a switching circuit 52.

The head chip 51 includes a plurality of discharge portions D for discharging ink. Each of the plurality of discharge portions D includes a piezoelectric element 51*f*. Here, each piezoelectric element 51*f* includes an active portion P1 as an example of the "first active portion" and active portions P2 and P3 as examples of "second active portions". The active portion P1 is driven by receiving the supply of a supply signal Vin-A. On the other hand, each of the active portions P2 and P3 is driven by receiving the supply of a supply signal Vin-B. Although not illustrated in FIG. 2, each discharge portion D includes a nozzle N and a pressure chamber C, which will be described later, in addition to the piezoelectric element 51*f*. Details of the head chip 51 will be described later with reference to FIGS. 3 to 6.

Under the control of the control unit 20, the switching circuit 52 switches whether or not to supply a discharge signal Com output from the control unit 20 to the active portion P1 as the supply signal Vin-A to each of the plurality of piezoelectric elements 51*f* of the head chip 51. In the present embodiment, the switching circuit 52 supplies a correction signal DC as the supply signal Vin-B to the active portions P2 and P3 of each piezoelectric element 51*f*. The details of the switching circuit 52 will be described later with reference to FIG. 7.

In the example illustrated in FIG. 2, the number of head chips 51 included in the liquid discharge head 50 is one, but the present disclosure is not limited thereto, and the number of head chips 51 included in the liquid discharge head 50 may be two or more.

As illustrated in FIG. 2, the control unit 20 includes a control circuit 21, which is an example of the "control portion", a storage circuit 22, a power supply circuit 23, and a drive signal generation circuit 24, which is an example of the "drive signal generation portion".

The control circuit 21 has a function of controlling the operation of each portion of the liquid discharge apparatus 100 and a function of processing various data. The control circuit 21 includes, for example, one or more processors such as a central processing unit (CPU).

The storage circuit 22 stores various programs executed by the control circuit 21 and various data such as print data Img processed by the control circuit 21. The storage circuit 22 includes, for example, a semiconductor memory of one or both of volatile memories such as a random access memory (RAM) and a non-volatile memory such as a read only memory (ROM), an electrically erasable programmable read-only memory (EEPROM) or a programmable ROM (PROM). The print data Img is supplied from an external device 200 such as a personal computer or a digital camera.

The power supply circuit 23 receives power from a commercial power supply (not illustrated) and generates various predetermined potentials. The various generated potentials are appropriately supplied to each portion of the liquid discharge apparatus 100. For example, the power supply circuit 23 generates a power supply potential VHV and an offset potential VBS. The offset potential VBS is supplied to the liquid discharge head 50. In addition, the power supply potential VHV is supplied to the drive signal generation circuit 24.

The drive signal generation circuit 24 is a circuit that generates a discharge signal Com and a correction signal DC. Specifically, the drive signal generation circuit 24 includes, for example, a DA conversion circuit and an amplifier circuit. In the drive signal generation circuit 24, the DA conversion circuit converts a waveform designation signal dCom from the control circuit 21 from a digital signal to an analog signal, and the amplifier circuit generates a discharge signal Com by amplifying the analog signal using the power supply potential VHV from the power supply circuit 23. In addition, in the drive signal generation circuit 24, the DA conversion circuit converts a voltage designation signal dDC described later from the control circuit 21 from a digital signal to an analog signal, and the amplifier circuit generates a correction signal DC by amplifying the analog signal using the power supply potential VHV from the power supply circuit 23. Here, among the waveforms included in the discharge signal Com, the waveform signal actually supplied to the active portion P1 of the piezoelectric element 51*f* is the supply signal Vin-A described above. The correction signal DC is supplied as the supply signal Vin-B described above to the active portion P2 or the active portion P3 of the piezoelectric element 51*f*. The waveform designation signal dCom is a digital signal for defining the waveform of the discharge signal Com. The voltage designation signal dDC is a digital signal for defining the voltage value of the correction signal DC.

The control circuit 21 controls the operation of each portion of the liquid discharge apparatus 100 by executing a program stored in the storage circuit 22. Here, by executing the program, the control circuit 21 generates control signals Sk1 and Sk2, a print data signal SI, a waveform designation signal dCom, a voltage designation signal dDC, a latch signal LAT, a change signal CNG, and a clock signal CLK as a signal for controlling the operation of each portion of the liquid discharge apparatus 100.

The control signal Sk1 is a signal for controlling the drive of the transport mechanism 30. The control signal Sk2 is a signal for controlling the drive of the movement mechanism 40. The print data signal SI is a digital signal for designating an operating state of the piezoelectric element 51*f*. The latch signal LAT and the change signal CNG are timing signals that are used together with the print data signal SI and define the ink discharge timing from each nozzle of the head chip 51. These timing signals are generated, for example, based on the output of an encoder that detects the position of the carriage 41 described above.

In addition, the control circuit 21 adjusts the voltage value indicated by the voltage designation signal dDC according to the print data signal SI. As a result, the correction signal DC is adjusted. As a result, the size of the ink droplet discharged from the nozzle N is adjusted for each unit period Tu described later. Here, the print data signal SI is an example of "droplet amount information", and is information on the amount of ink discharged from the nozzle N per one discharge.

Furthermore, during the printing period during which the liquid discharge head 50 continuously discharges ink, the control circuit 21 controls driving of the drive signal generation circuit 24 so as to generate the correction signal DC. During a period other than the printing period, such as a standby period, the control circuit 21 lowers the potential of the correction signal DC or stops generation of the correction signal DC by the drive signal generation circuit 24. As a result, the potential of the correction signal DC decreases, or the correction signal DC is supplied to neither the active portions P1, P2, nor P3 during periods other than a discharge period T described later.

1-3. Overall Configuration of Liquid Discharge Head

Figure 3:
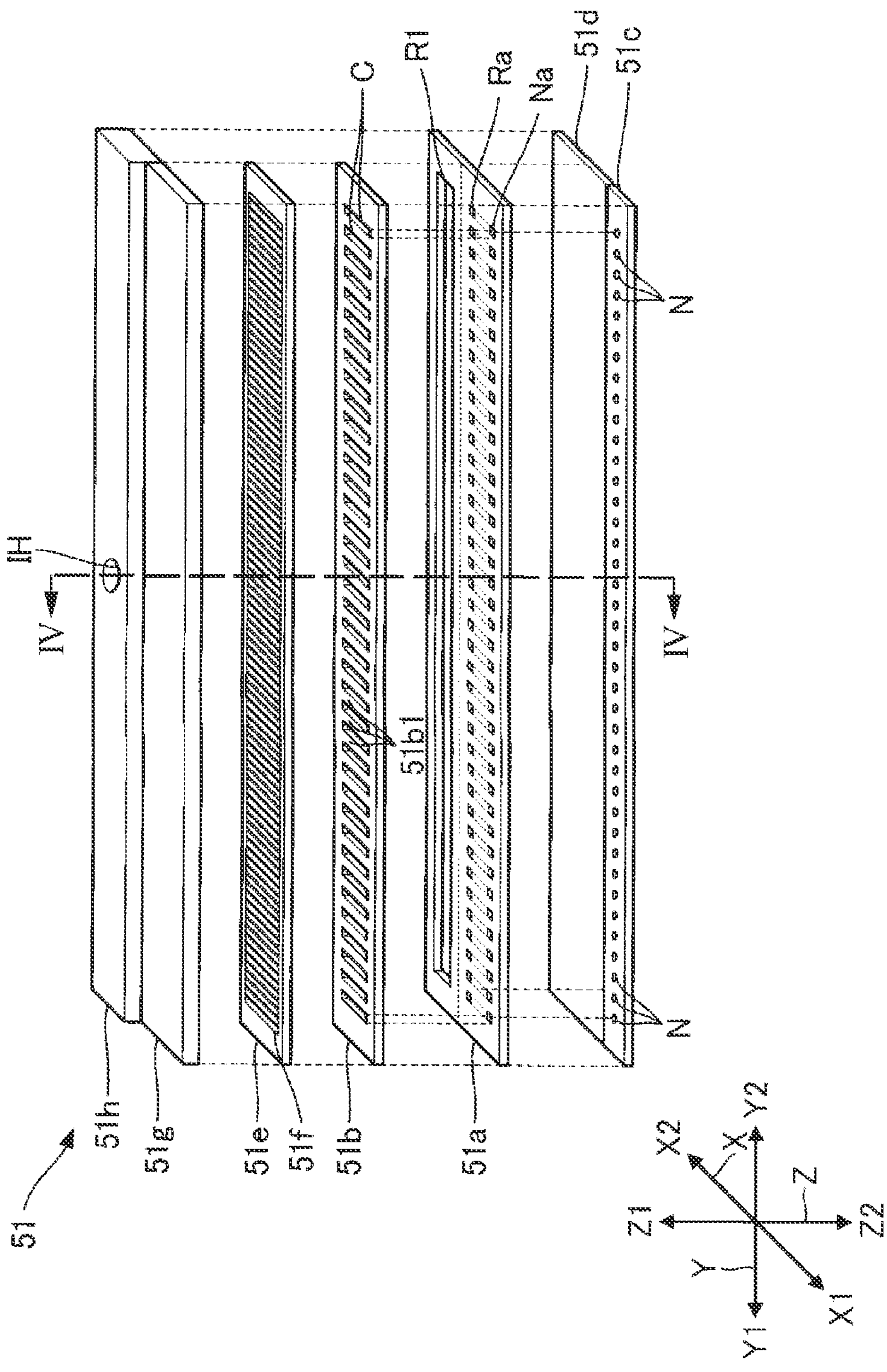
FIG. 3 is an exploded perspective view of a head chip.
Figure 4:
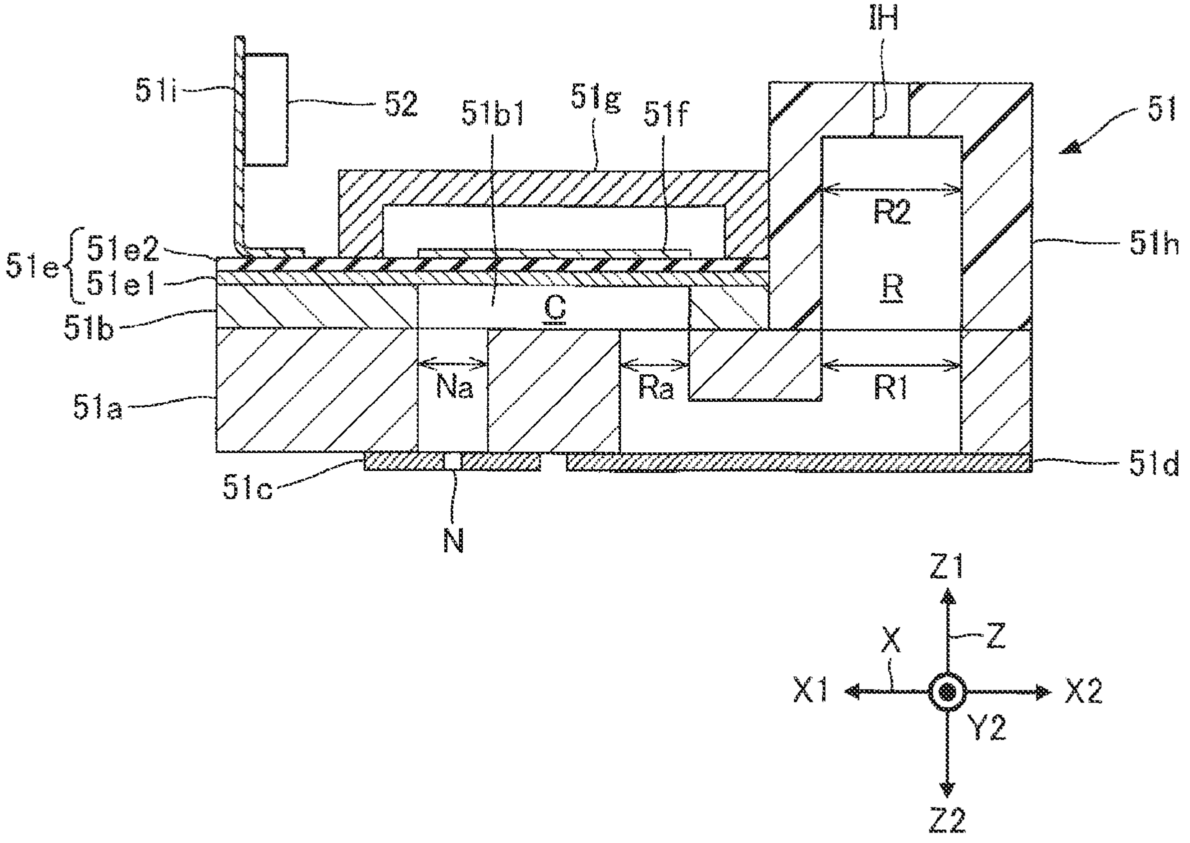
FIG. 4 is a cross-sectional view taken along the line IV-IV in FIG. 3.

FIG. 3 is an exploded perspective view of the head chip 51. FIG. 4 is a cross-sectional view taken along the line IV-IV in FIG. 3. As illustrated in FIGS. 3 and 4, the head chip 51 includes a flow path substrate 51*a*, a pressure chamber substrate 51*b*, a nozzle plate 51*c*, a vibration absorber 51*d*, a diaphragm 51*e*, a plurality of piezoelectric elements 51*f*, a cover 51*g*, a case 51*h*, and a wiring substrate 51*i*.

Here, the pressure chamber substrate 51*b*, the diaphragm 51*e*, the plurality of piezoelectric elements 51*f*, the case 51*h*, and the cover 51g are installed in a region located in the Z1 direction from the flow path substrate 51*a*. On the other hand, the nozzle plate 51*c* and the vibration absorber 51*d* are installed in a region located in the Z2 direction from the flow path substrate 51*a*. Each element of the liquid discharge head 50 is generally a plate-like member elongated in the direction along the Y axis, and is bonded to each other with an adhesive, for example.

As illustrated in FIG. 3, the nozzle plate 51*c* is a plate-like member provided with a plurality of nozzles N arranged in a direction along the Y axis. Each nozzle N is a through-hole through which ink passes. The nozzle plate 51*c* is manufactured by processing a silicon single crystal substrate by a semiconductor manufacturing technique using a processing technique such as dry etching or wet etching, for example. However, other known methods and materials may be appropriately used for manufacturing the nozzle plate 51*c*.

The flow path substrate 51*a* is a plate-like member for forming a flow path for ink. As illustrated in FIGS. 2 and 3, the flow path substrate 51*a* is provided with an opening portion R1, a plurality of supply flow paths Ra, and a plurality of communication flow paths Na. The opening portion R1 is an elongated through-hole extending in the direction along the Y axis so as to be continuous over the plurality of nozzles N in plan view viewed in the direction along the Z axis. On the other hand, each of the supply flow path Ra and the communication flow path Na is a through-hole provided for each nozzle N individually. Each of the plurality of supply flow paths Ra communicates with the opening portion R1. The flow path substrate 51*a* is manufactured by processing a silicon single crystal substrate by, for example, semiconductor manufacturing technique, similarly to the nozzle plate 51*c* described above. However, other known methods and materials may be appropriately used for manufacturing the flow path substrate 51*a*. A part of the supply flow path Ra may be formed in the pressure chamber substrate 51*b*.

The pressure chamber substrate 51*b* is a plate-like member in which a plurality of pressure chambers C corresponding to the plurality of nozzles N are formed. The pressure chamber C is located between the flow path substrate 51*a* and the diaphragm 51*e*, and is a space called a cavity for applying pressure to the ink filled in the pressure chamber C. The plurality of pressure chambers C are arranged in the direction along the Y axis. Each pressure chamber C is configured to include holes that open on both surfaces of the pressure chamber substrate 51*b*, and has an elongated shape extending in the direction along the X axis. The end of each pressure chamber C in the X2 direction communicates with the corresponding supply flow path Ra. On the other hand, the end of each pressure chamber C in the X1 direction communicates with the corresponding communication flow path Na. The cross-sectional area of the supply flow path Ra is narrower than that of the pressure chamber C, and this portion functions as a flow path resistance, so that backflow is suppressed when pressure is applied to the ink. The pressure chamber substrate 51*b* is manufactured by processing a silicon single crystal substrate by, for example, semiconductor manufacturing technique, similar to the nozzle plate 51*c* described above. However, other known methods and materials may be appropriately used for the manufacture of each of the pressure chamber substrates 51*b*.

The diaphragm 51*e* is disposed on the surface of the pressure chamber substrate 51*b* facing the Z1 direction. The diaphragm 51*e* is a plate-like member that can elastically deform. In the example illustrated in FIG. 4, the diaphragm 51*e* includes a first layer 51*e*1 that is an elastic film and a second layer 51*e*2 that is an insulating film, which are laminated in this order in the Z1 direction. The details of the diaphragm 51*e* will be described with reference to FIG. 6 described later.

The plurality of piezoelectric elements 51*f* corresponding to the nozzles N or the pressure chambers C different from each other are disposed on the surface of the diaphragm 51*e* facing the Z1 direction. Each piezoelectric element 51*f* is a passive element deformed by the supply of the discharge signal Com and the correction signal DC, and has an elongated shape extending in the direction along the X axis. The plurality of piezoelectric elements 51*f* are arranged in a direction along the Y axis so as to correspond to the plurality of pressure chambers C. When the diaphragm 51*e* vibrates in conjunction with the deformation of the piezoelectric element 51*f*, the pressure in the pressure chamber C fluctuates, so that ink is discharged from the nozzle N. Details of the piezoelectric element 51*f* will be described with reference to FIG. 6 described later.

The case 51*h* is a case for storing the ink supplied to the plurality of pressure chambers C, and is bonded to the surface of the flow path substrate 51*a* facing the Z1 direction with an adhesive or the like. The case 51*h* is made of, for example, a resin material and manufactured by injection molding. The case 51*h* is provided with an accommodation portion R2 and an inlet IH. The accommodation portion R2 is a recessed portion having an outer shape corresponding to the opening portion R1 of the flow path substrate 51*a*. The inlet IH is a through-hole that communicates with the accommodation portion R2. A space defined by the opening portion R1 and the accommodation portion R2 functions as a liquid storage chamber R, which is a reservoir for storing ink. Ink from the liquid container 10 is supplied to the liquid storage chamber R through the inlet IH.

The vibration absorber 51*d* is an element for absorbing pressure fluctuations in the liquid storage chamber R. The vibration absorber 51*d* is, for example, a compliance substrate that is an elastically deformable flexible sheet member. Here, the vibration absorber 51*d* is disposed on the surface of the flow path substrate 51*a* facing the Z2 direction so as to block the opening portion R1 of the flow path substrate 51*a* and the plurality of supply flow paths Ra to constitute the bottom surface of the liquid storage chamber R.

The cover 51*g* is a structure that protects the plurality of piezoelectric elements 51*f* and reinforces the mechanical strength of the pressure chamber substrate 51*b* and the diaphragm 51*e*. The cover 51*g* is bonded to the surface of the diaphragm 51*e* with an adhesive, for example. The cover 51*g* is provided with recessed portions that accommodate the plurality of piezoelectric elements 51*f*.

The wiring substrate 51*i* is bonded to the surface of the pressure chamber substrate 51*b* or the diaphragm 51*e* facing the Z1 direction. The wiring substrate 51*i* is a mounting component on which a plurality of wirings for electrically coupling the control unit 20 and the liquid discharge head 50 are formed. The wiring substrate 51*i* is a flexible wiring substrate such as a flexible printed circuit (FPC) and a flexible flat cable (FFC). The switching circuit 52 is mounted on the wiring substrate 51*i*.

1-4. Details of Diaphragm and Piezoelectric Element

Figure 5:
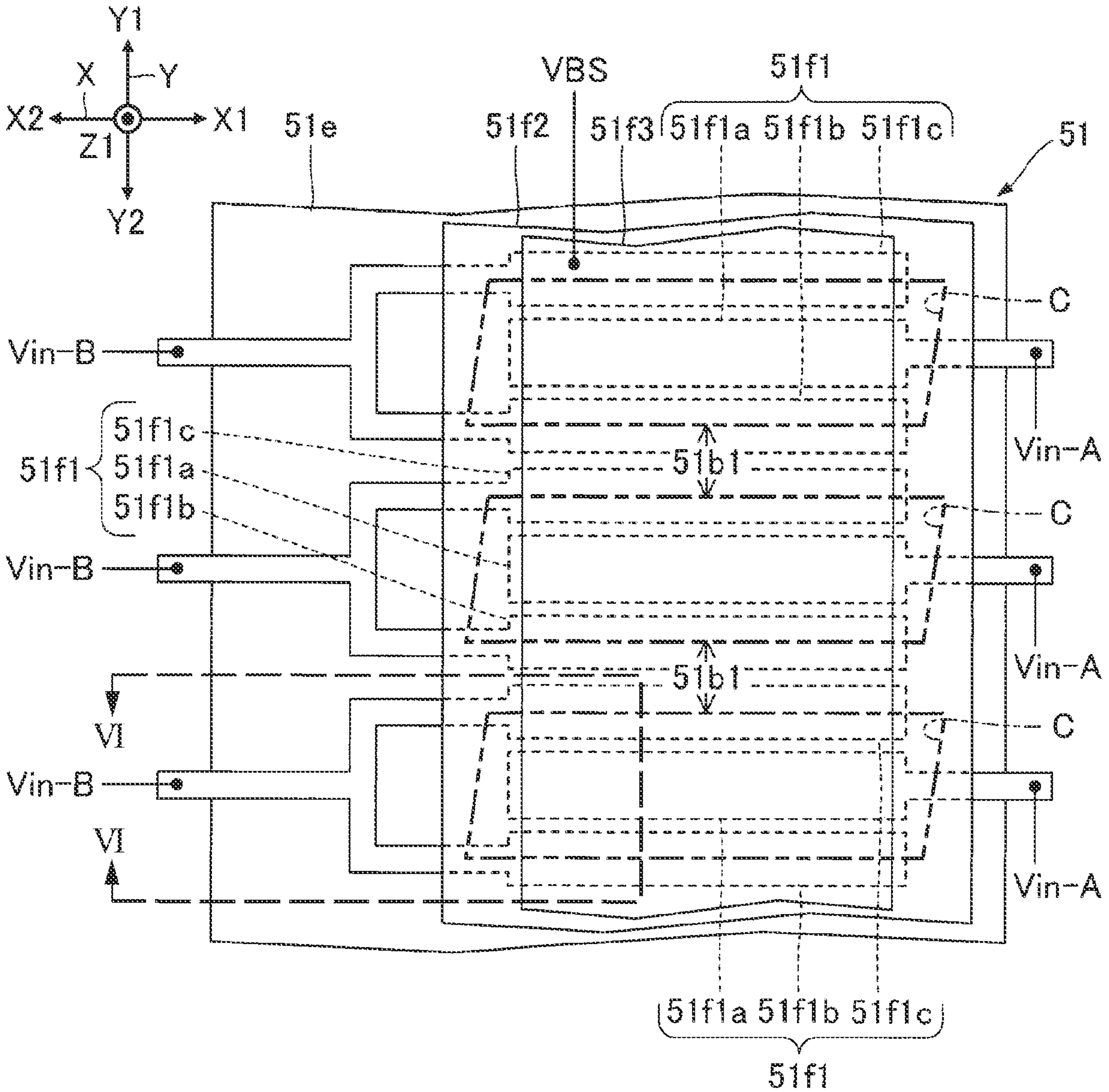
FIG. 5 is a plan view of the head chip.
Figure 6:
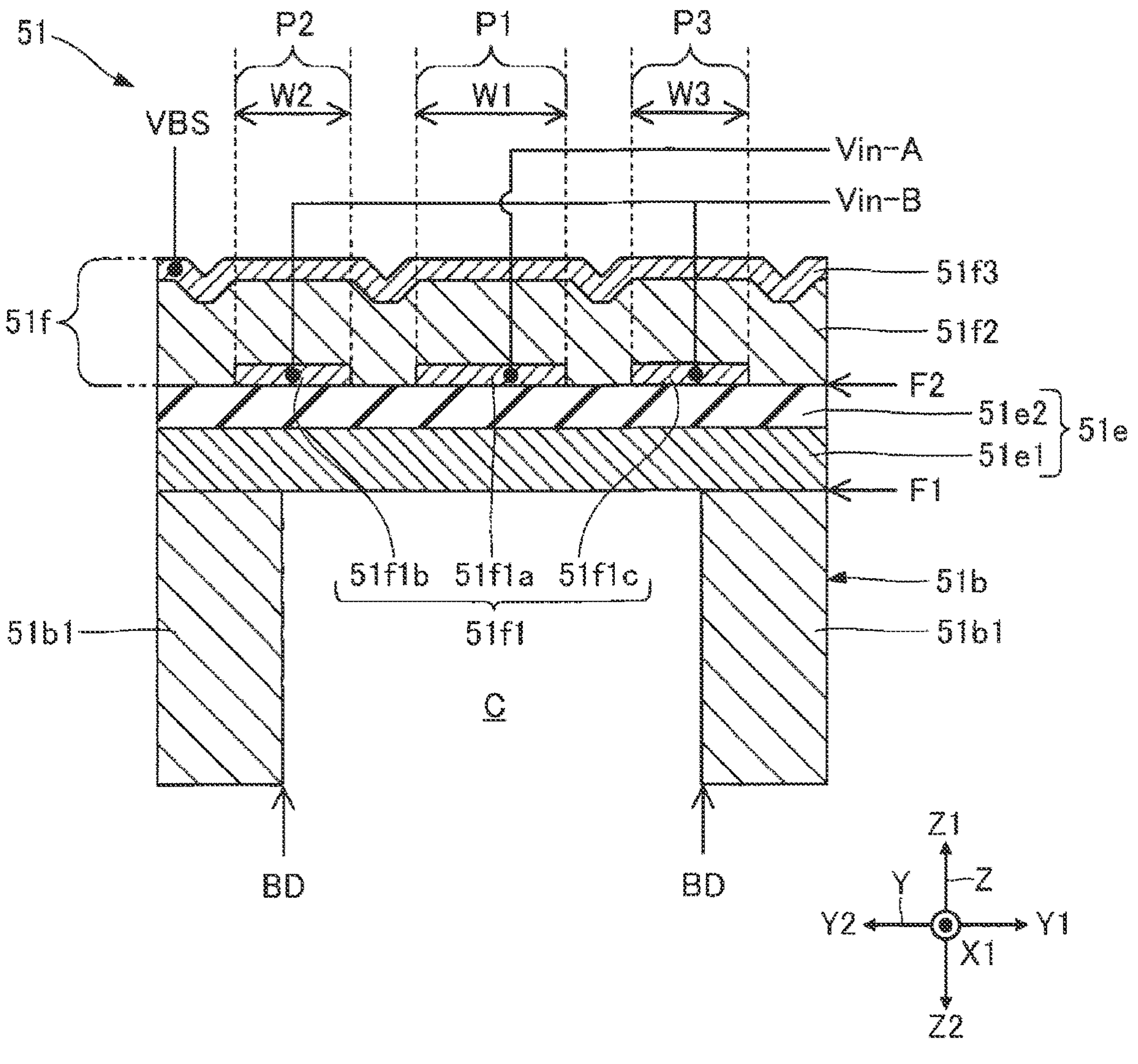
FIG. 6 is a cross-sectional view taken along the line VI-VI in FIG. 5.

FIG. 5 is a plan view of the head chip 51. FIG. 6 is a cross-sectional view taken along the line VI-VI in FIG. 5. In FIG. 5, a shape of the pressure chamber C in plan view is indicated by a two-dot chain line. A wall-shaped partition wall 51*b*1 extending along the X direction is provided between two adjacent pressure chambers C of the pressure chamber substrate 51*b*. The partition wall 51*b*1 partitions the pressure chamber C.

In the example illustrated in FIG. 5, the shape of the pressure chamber C in plan view is a parallelogram. Such a shape of the pressure chamber C in plan view is formed, for example, by anisotropically etching a silicon single crystal substrate having a plane orientation (110).

As illustrated in FIG. 6, the diaphragm 51*e* includes a first surface F1 and a second surface F2 facing in the direction opposite to the first surface F1. In the example illustrated in FIG. 6, the thickness direction of the diaphragm 51*e* is the direction along the Z axis. Therefore, the first surface F1 is the surface of the diaphragm 51*e* facing the Z2 direction, and the second surface F2 is the surface of the diaphragm 51*e* facing the Z1 direction. The piezoelectric element 51*f* is disposed on the second surface F2. The pressure chamber substrate 51*b* is disposed on the first surface F1.

The diaphragm 51*e* includes the first layer 51*e*1 and the second layer 51*e*2, which are laminated in this order in the Z1 direction. The first layer 51*e*1 is, for example, an elastic film made of silicon oxide ($SiO_2$). The second layer 51*e*2 is, for example, an insulating film made of zirconium oxide ($ZrO_2$).

The first layer 51*e*1 is not limited to silicon oxide. In addition, a part or all of the diaphragm 51*e* may be integrally made of the same material as that of the pressure chamber substrate 51*b*. In addition, the diaphragm 51*e* may be made of a layer of single material.

As illustrated in FIG. 5, the piezoelectric element 51*f* overlaps the pressure chamber C in plan view. As illustrated in FIG. 6, the piezoelectric element 51*f* includes a first electrode layer 51*f*1, a piezoelectric layer 51*f*2, and a second electrode layer 51*f*3, which are laminated in this order in the Z1 direction.

Another layer such as a layer for enhancing adhesion may be appropriately interposed between the layers of the piezoelectric element 51*f* or between the piezoelectric element 51*f* and the diaphragm 51*e*. In addition, a seed layer that improves the orientation of the piezoelectric layer 51*f*2 may be provided between the first electrode layer 51*f*1 and the piezoelectric layer 51*f*2.

The first electrode layer 51*f*1 includes individual electrodes 51*f*1*a*, 51*f*1*b*, and 51*f*1*c* for each piezoelectric element 51*f*. Each of the individual electrodes 51*f*1*a*, 51*f*1*b*, and 51*f*1*c* extends in the direction along the X axis. The individual electrodes 51*f*1*a*, 51*f*1*b*, and 51*f*1*c* are arranged in the direction along the Y axis at intervals from each other.

Here, the individual electrode 51_f_1_a_ is disposed in the central portion of the pressure chamber C in the width direction and overlaps the center of the pressure chamber C in plan view. The discharge signal Com is supplied to the individual electrode 51_f_1_a_ through the wiring. On the other hand, each of the individual electrode 51_f_1_b_ and the individual electrode 51_f_1_c_ is disposed at an end portion of the pressure chamber C in the width direction, and overlaps the pressure chamber C at a position closer to the outer edge BD of the pressure chamber C than the individual electrode 51_f_1_a_ in plan view. The correction signal DC is supplied to each of the individual electrodes 51_f_1_b_ and 51_f_1_c_ through the wiring.

The first electrode layer 51_f_1 includes, for example, a first layer made of titanium (Ti), a second layer made of platinum (Pt), and a third layer made of iridium (Ir), which are laminated in this order in the Z1 direction.

Here, the first layer described above of the first electrode layer 51_f_1 functions as an adhesion layer that improves adhesion of the first electrode layer 51_f_1 to the diaphragm 51_e_. Although the thickness of the first layer is not particularly limited, the thickness is, for example, approximately 3 nm or more and 50 nm or less. The constituent material of the first layer is not limited to titanium, and for example, chromium may be used instead of titanium.

In addition, platinum forming the second layer described above and iridium forming the third layer of the first electrode layer 51_f_1 are both electrode materials with excellent conductivity and have chemical properties close to each other. Therefore, the characteristics of the first electrode layer 51_f_1 as an electrode can be improved. Although the thickness of the second layer is not particularly limited, the thickness is, for example, approximately 50 nm or more and 200 nm or less. Although the thickness of the third layer is not particularly limited, the thickness is, for example, approximately 4 nm or more and 20 nm or less.

The configuration of the first electrode layer 51_f_1 is not limited to the example described above. For example, either the second layer or the third layer described above may be omitted, or a layer made of iridium may be further provided between the first layer and the second layer described above. In addition, a layer made of an electrode material other than iridium and platinum may be used instead of the second layer and third layer or in addition to the second layer and third layer. Examples of the electrode material include metal materials such as aluminum (Al), nickel (Ni), gold (Au), and copper (Cu).

The piezoelectric layer 51_f_2 is disposed between the first electrode layer 51_f_1 and the second electrode layer 51_f_3. The piezoelectric layer 51_f_2 has a strip shape extending in the direction along the Y axis so as to be continuous over the plurality of piezoelectric elements 51_f_. The piezoelectric layer 51_f_2 may be provided individually for each piezoelectric element 51_f_ or for each active portion P1, P2, and P3.

The piezoelectric layer 51_f_2 is made of a piezoelectric material having a perovskite crystal structure represented by the general composition formula $ABO_3$. Examples of the piezoelectric material include known materials such as lead titanate ($PbTiO_3$) and lead zirconate titanate ($Pb(Zr,Ti)O_3$). In addition, the piezoelectric material forming the piezoelectric layer 51_f_2 may be a non-lead material such as barium titanate.

For example, the piezoelectric layer 51_f_2 is formed by forming a piezoelectric precursor layer by a liquid phase method such as a sol-gel method or a metal organic decomposition (MOD) method, and then firing and crystallizing the precursor layer. Here, the piezoelectric layer 51_f_2 may be configured to include a single layer, but when being configured to include a plurality of layers, even in a case in which the thickness of the piezoelectric layer 51_f_2 is increased, there is an advantage that the characteristics of the piezoelectric layer 51_f_2 are likely to be improved.

The second electrode layer 51_f_3 is a strip-shaped common electrode that extends in the direction along the Y axis so as to be continuous over the plurality of piezoelectric elements 51_f_. The offset potential VBS is supplied as a predetermined reference voltage to the second electrode layer 51_f_3.

The second electrode layer 51_f_3 includes, for example, a layer made of iridium (Ir) and a layer made of titanium (Ti), which are laminated in this order in the Z1 direction.

The constituent material of the second electrode layer 51_f_3 is not limited to iridium and titanium, and may be, for example, metal materials such as platinum (Pt), aluminum (Al), nickel (Ni), gold (Au), and copper (Cu).

The above piezoelectric element 51_f_ includes the active portions P1, P2, and P3. The active portion P1 is a portion of the piezoelectric element 51_f_ where the individual electrode 51_f_1_a_, the piezoelectric layer 51_f_2, and the second electrode layer 51_f_3 all overlap when viewed in the thickness direction of the diaphragm 51_e_. The active portion P2 is a portion of the piezoelectric element 51_f_ where the individual electrode 51_f_1_b_, the piezoelectric layer 51_f_2, and the second electrode layer 51_f_3 all overlap when viewed in the thickness direction of the diaphragm 51_e_. The active portion P3 is a portion of the piezoelectric element 51_f_ where the individual electrode 51_f_1_c_, the piezoelectric layer 51_f_2, and the second electrode layer 51_f_3 all overlap when viewed in the thickness direction of the diaphragm 51_e_.

The active portion P1 is disposed between the active portion P2 and the active portion P3. In the example illustrated in FIG. 6, the active portion P2, the active portion P1, and the active portion P3 are arranged in this order in the Y1 direction. In addition, each of the active portions P1, P2, and P3 extends in the direction along the X axis.

Here, the active portion P1 overlaps the center of the pressure chamber C and does not overlap the outer edge BD of the pressure chamber C when viewed in the thickness direction of the diaphragm 51_e_. On the other hand, each of the active portion P2 and the active portion P3 overlaps the pressure chamber C at a position closer to the outer edge BD of the pressure chamber C than the active portion P1 when viewed in the thickness direction of the diaphragm 51_e_. In the example illustrated in FIG. 6, each of the active portion P2 and the active portion P3 is disposed across the pressure chamber C and the partition wall 51_b_1 and overlaps the outer edge BD, when viewed in the thickness direction of the diaphragm 51_e_.

A width W1 of the active portion P1 along the Y axis is smaller than a width of the pressure chamber C along the Y axis. Preferably, the width W1 is smaller than the width of the pressure chamber C along the Y axis and is ½ or more of the width of the pressure chamber C along the Y axis. In addition, the width W2 of the active portion P2 along the Y axis is smaller than the width of the pressure chamber C along the Y axis, and preferably ½ or less of the width of the pressure chamber C along the Y axis. Similarly, the width W3 of the active portion P3 along the Y axis is smaller than the width of the pressure chamber C along the Y axis, and preferably ½ or less of the width of the pressure chamber C along the Y axis. Here, the width W2 and width W3 may be equal to or different from each other.

1-5. Configuration of Switching Circuit

Figure 7:
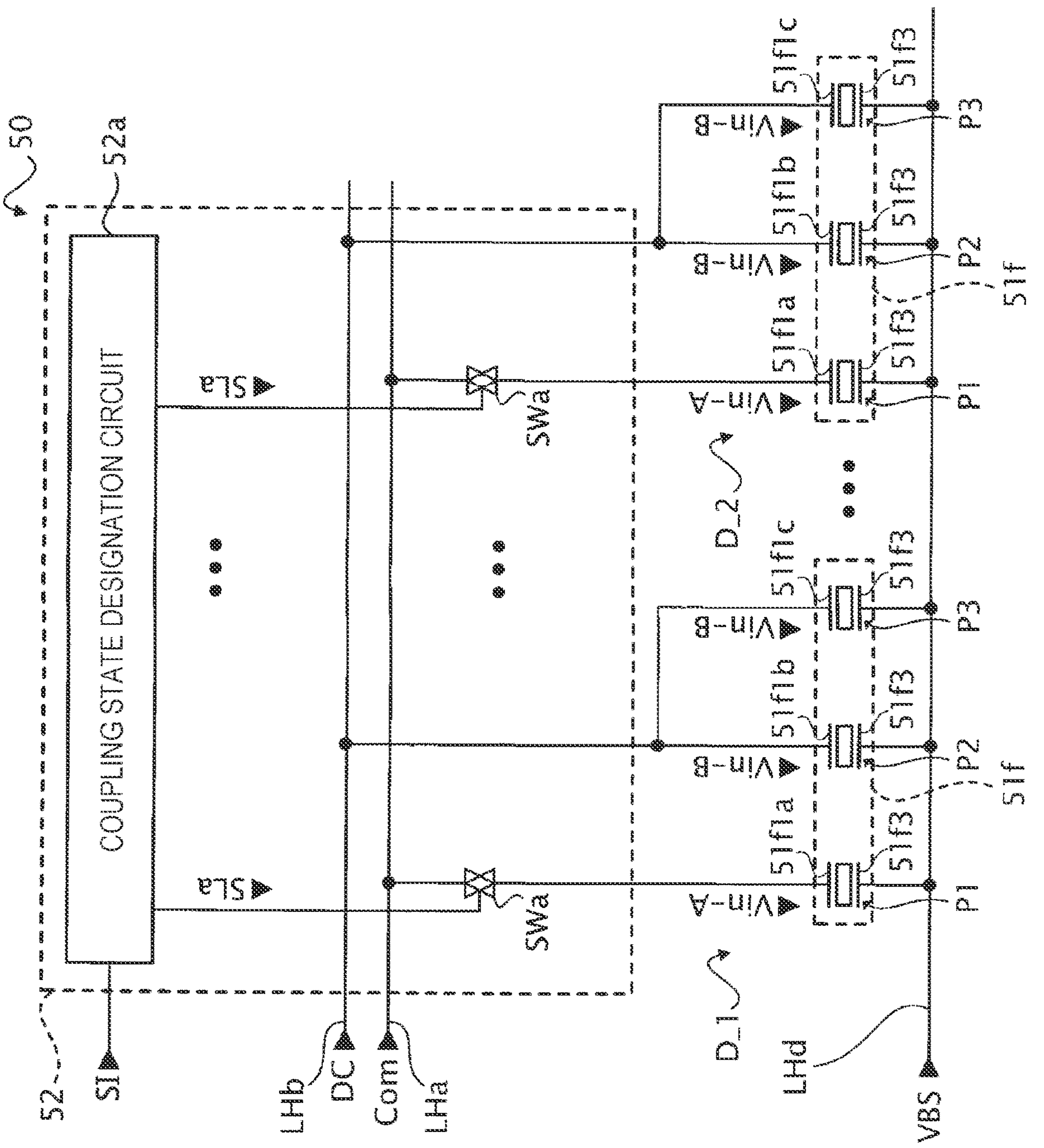
FIG. 7 is a diagram for describing a switching circuit in the first embodiment.

FIG. 7 is a diagram for describing the switching circuit 52 in the first embodiment. The switching circuit 52 will be described below with reference to FIG. 7. In addition, in FIG. 7, as two discharge portions D among the plurality of discharge portions D, a discharge portion D_1 and a discharge portion D_2 are illustrated representatively.

As illustrated in FIG. 7, the switching circuit 52 is coupled to the wiring LHa and the wiring LHb. The wiring LHa is a signal line that transmits the discharge signal Com. The wiring LHb is a signal line that transmits the correction signal DC. In addition, the wiring LHd is coupled to the second electrode layer 51*f*3 of the piezoelectric element 51*f*. The wiring LHd is a power supply line to which the offset potential VBS is supplied.

In the present embodiment, the wiring LHb is electrically coupled to the individual electrodes 51*f*1*b* and 51*f*1*c* of the first electrode layer 51*f*1 of the piezoelectric element 51*f*. In the example illustrated in FIG. 7, the wiring LHb passes through the switching circuit 52, but the wiring LHb may be electrically coupled to the individual electrodes 51*f*1*b* and 51*f*1*c* of the first electrode layer 51*f*1 without passing through the switching circuit 52.

The switching circuit 52 includes a plurality of switches SWa corresponding one-to-one with the plurality of piezoelectric elements 51*f*, and a coupling state designation circuit 52*a* that designates the coupling state of these switches.

The switch SWa is a switch that switches between conduction (on) and non-conduction (off) between the wiring LHa for transmitting the discharge signal Com and the individual electrode 51*f*1*a* of the piezoelectric element 51*f*. Each of these switches is, for example, a transmission gate.

The coupling state designation circuit 52*a* generates a coupling state designation signal SLa designating on/off of the plurality of switches SWa based on the clock signal CLK, the print data signal SI, the latch signal LAT, and the change signal CNG supplied from the control circuit 21.

For example, although not illustrated, the coupling state designation circuit 52*a* includes a plurality of transfer circuits, a plurality of latch circuits, and a plurality of decoders so as to correspond one-to-one with the plurality of piezoelectric elements 51*f*. Among these circuits, the print data signal SI is supplied to the transfer circuit. Here, the print data signal SI includes an individual designation signal for each piezoelectric element 51*f*, and the individual designation signal is serially supplied to the print data signal SI. For example, the individual designation signal is sequentially transferred to the plurality of transfer circuits in synchronization with the clock signal CLK. In addition, the latch circuit latches the individual designation signal supplied to the transfer circuit based on the latch signal LAT. In addition, the decoder also generates a coupling state designation signal SLa based on the individual designation signal, the latch signal LAT, and the change signal CNG.

On/off of the switch SWa is switched according to the coupling state designation signal SLa generated as described above. For example, the switch SWa is turned on when the coupling state designation signal SLa is at high level, and turned off when the coupling state designation signal SLa is at low level. As described above, the switching circuit 52 supplies a part or all of the waveform included in the discharge signal Com as the supply signal Vin-A, and the correction signal DC as the supply signal Vin-B to the one or more piezoelectric elements 51*f* selected from the plurality of piezoelectric elements 51*f*.

1-6. Discharge Signal and Correction Signal

Figure 8:
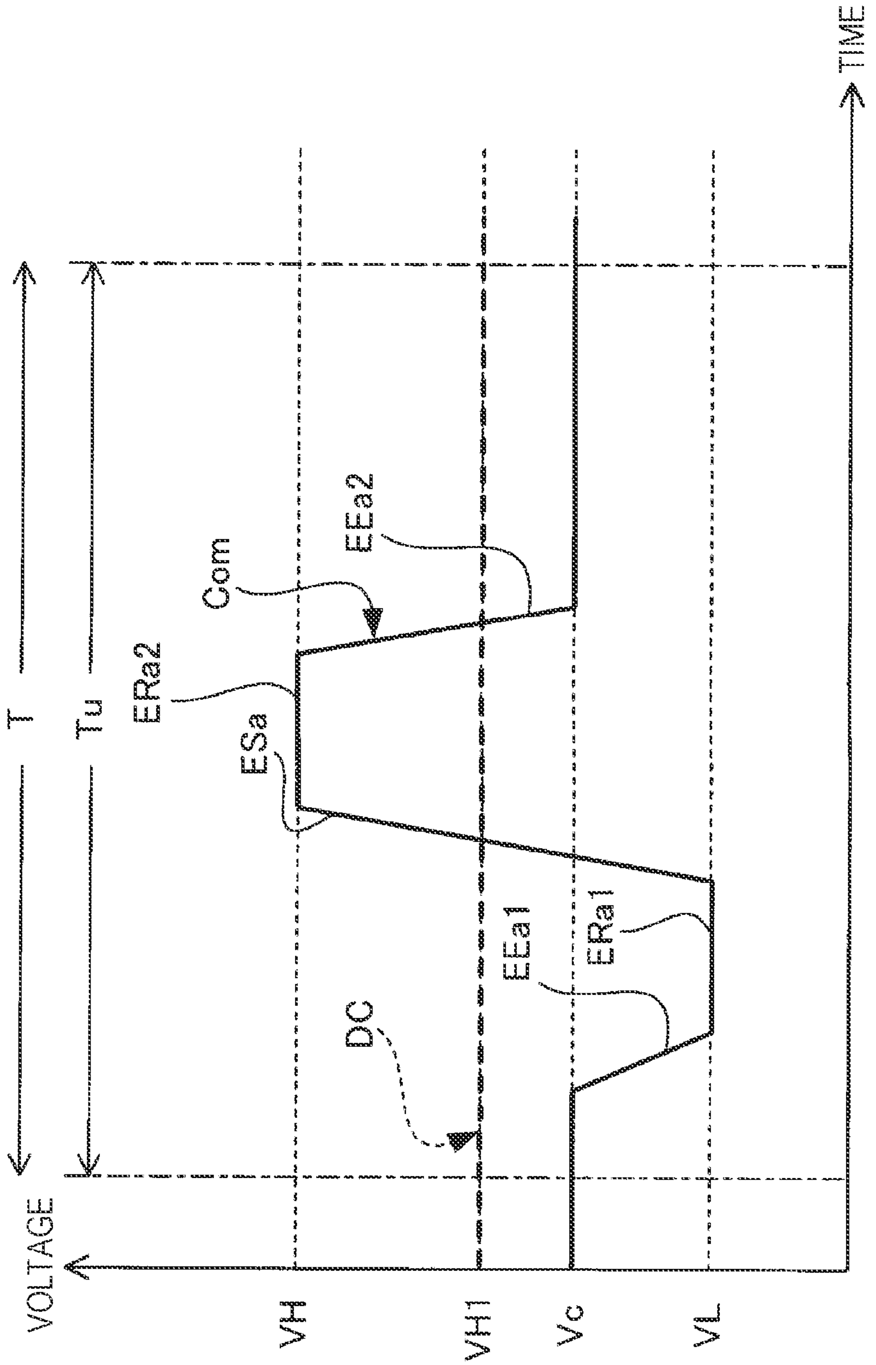
FIG. 8 is a graph for describing a discharge signal and a correction signal in the first embodiment.

FIG. 8 is a graph for describing the discharge signal Com and the correction signal DC in the first embodiment. The vertical axis "voltage" in FIG. 8 is the potential difference between the discharge signal Com or the correction signal DC and the offset potential VBS. The vertical axis "voltage" in FIG. 8 may be the potential of the discharge signal Com or the correction signal DC.

The discharge signal Com is a signal that discharges the liquid from the nozzle N by being supplied to the active portion P1. As illustrated in FIG. 8, the discharge signal Com has a waveform that changes for each unit period Tu of a predetermined cycle. The unit period Tu is defined by the latch signal LAT described above and the like, and corresponds to a print cycle in which dots are formed on the medium M by ink from the nozzles N. In addition, the unit period Tu during which ink is discharged from the nozzles N is a discharge period T.

In the example illustrated in FIG. 8, the discharge signal Com has a waveform that uses the intermediate potential Vc as a reference potential and returns from the intermediate potential Vc to the intermediate potential Vc via the potential VL and the potential VH in this order within the unit period Tu. Here, the intermediate potential Vc is, for example, a potential higher than the offset potential VBS. The potential VL is a potential lower than the intermediate potential Vc. The potential VH is a potential higher than the intermediate potential Vc.

Here, the waveform portion of the discharge signal Com that lowers the potential from the intermediate potential Vc to the potential VL is the expansion element EEa1 that expands the volume of the pressure chamber C. The waveform portion of the discharge signal Com that maintains the potential at the potential VL is the holding element ERa1. The waveform portion of the discharge signal Com that raises the potential from the potential VL to the potential VH is the shrinkage element ESa that shrinks the volume of the pressure chamber C. The waveform portion of the discharge signal Com that maintains the potential at the potential VH is the holding element ERa2. The waveform portion of the discharge signal Com that lowers the potential from the potential VH to the intermediate potential Vc is the expansion element EEa2 that expands the volume of the pressure chamber C.

The waveform of the discharge signal Com is not limited to the example illustrated in FIG. 8, and is random as long as the liquid can be discharged from the nozzle N by being supplied to the active portion P1.

On the other hand, the correction signal DC is a constant potential signal of potential VH1. The potential VH1 is preferably higher than the intermediate potential Vc, but may be lower than the intermediate potential Vc. In the example illustrated in FIG. 8, the potential VH1 is lower than the potential VH. The potential VH1 may be higher than the potential VH.

Figure 9:
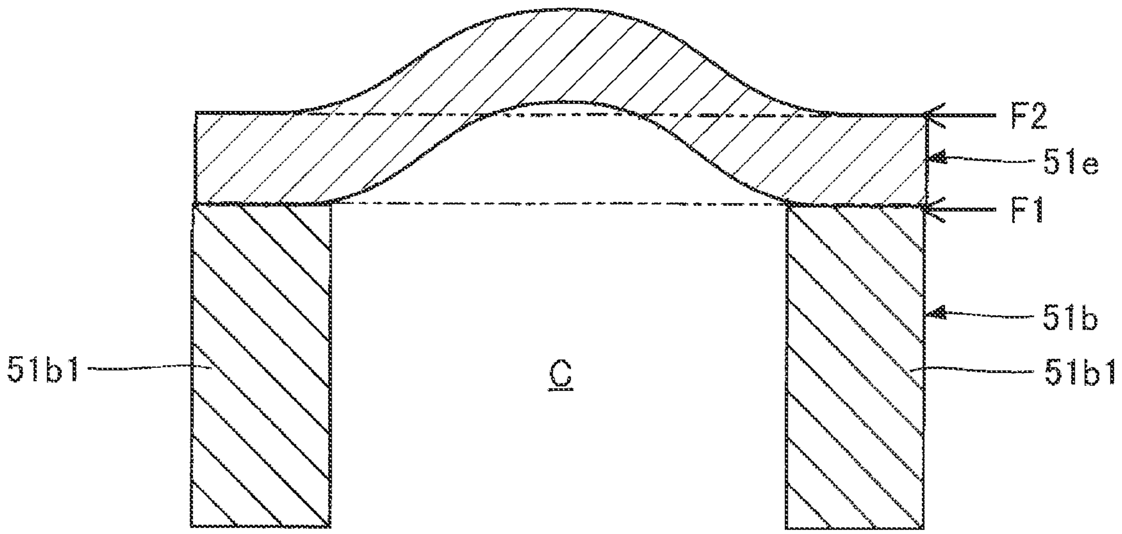
FIG. 9 is a schematic diagram for describing deformation of a diaphragm.
Figure 10:
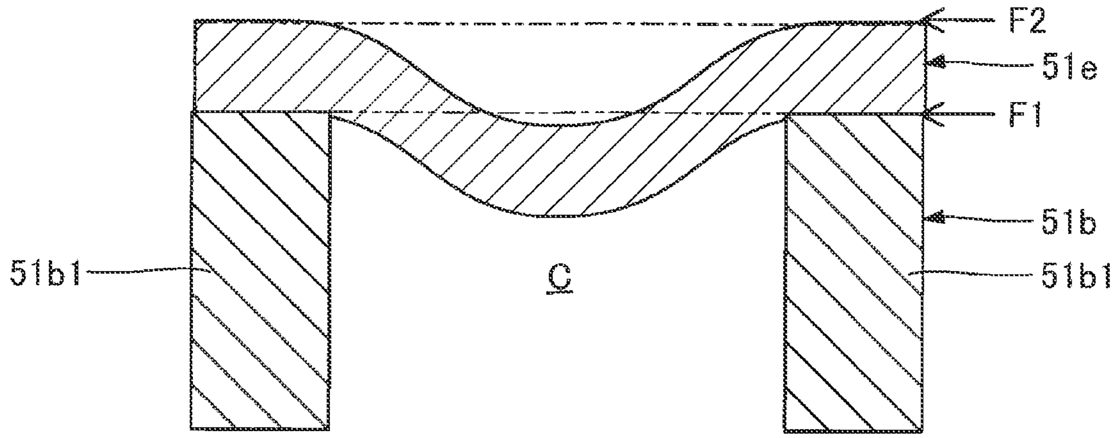
FIG. 10 is a schematic diagram for describing deformation of the diaphragm.

FIGS. 9 and 10 are schematic diagrams for describing deformation of the diaphragm 51*e*. In these figures, for convenience of explanation, the illustration of the piezoelectric element 51F is omitted and the diaphragm 51*e* is schematically illustrated. In addition, in FIGS. 9 and 10, the diaphragm 51*e* in a natural state, which is an ideal reference state, is indicated by a two-dot chain line. The "natural state of the diaphragm 51*e*" refers to the state of the diaphragm 51*e* when no voltage is applied to the piezoelectric element 51*f*.

When the holding element ERa1 of the discharge signal Com is supplied to the active portion P1, the diaphragm 51*e* deforms so that the first surface F1 is recessed as illustrated in FIG. 9. As a result, the volume of the pressure chamber C expands. Therefore, when the holding element ERa2 of the discharge signal Com is supplied to the active portion P1, the diaphragm 51*e* deforms so that the first surface F1 is projected as illustrated in FIG. 10. As a result, the volume of the pressure chamber C shrinks. As a result, ink is discharged from the nozzle N.

The actual natural state of the diaphragm 51*e* may not be the state indicated by the two-dot chain lines in FIGS. 9 and 10 due to manufacturing errors and the like, and may be a state where the diaphragm 51*e* is slightly bent so that the first surface F1 is projected. In this case, when the piezoelectric element 51*f* is driven using only the discharge signal Com, variations in discharge characteristics and the like occur.

Figure 11:
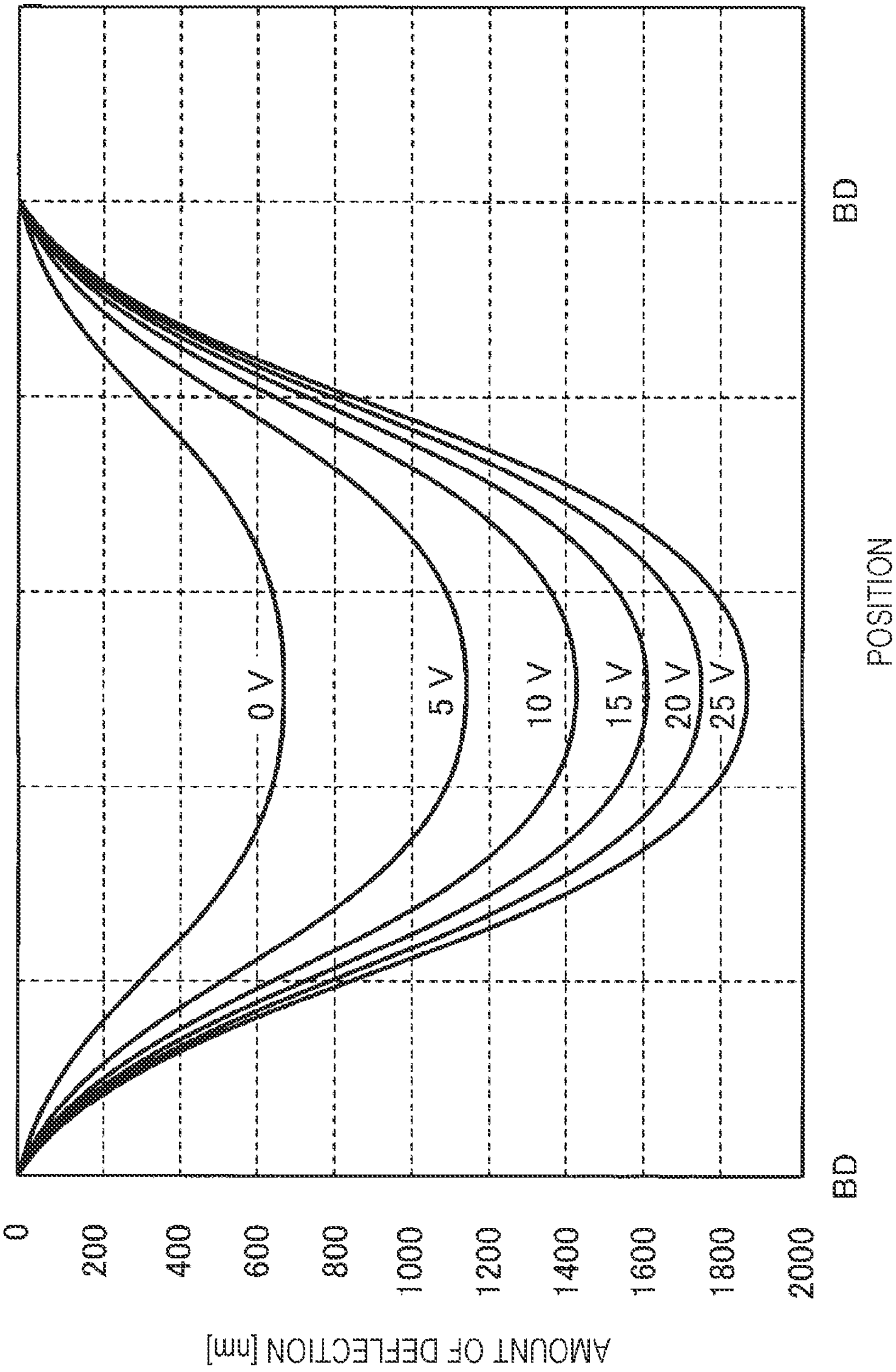
FIG. 11 is a graph illustrating a relationship between a position and the amount of deflection of the diaphragm for each voltage applied to a piezoelectric element.

FIG. 11 is a graph illustrating the relationship between the position and the amount of deflection of the diaphragm 51*e* for each voltage applied to the piezoelectric element 51*f*. FIG. 11 illustrates the relationship between the position and the amount of deflection of the diaphragm 51*e* at each applied voltage when the natural state of the diaphragm 51*e* is an ideal state.

As illustrated in FIG. 11, the higher the voltage applied to the piezoelectric element 51*f*, the greater the amount of deflection of the diaphragm 51*e*. However, the higher the voltage applied to the piezoelectric element 51*f*, the smaller the amount of deflection of the diaphragm 51*e* per unit voltage of the applied voltage. This indicates that the driving efficiency of the piezoelectric element 51*f* is lowered when the diaphragm 51*e* is bent in a natural state so that the first surface F1 is projected.

Therefore, the correction signal DC is used. When receiving the supply of the correction signal DC, the active portions P2 and P3 deform the diaphragm 51*e* in the direction opposite to when the active portion P1 receives the supply of the discharge signal Com. This is because the displacement of the end closer to the partition wall 511 is restricted by the partition wall 511, whereas the displacement of the end farther from the partition wall 511 is unlikely to be subject to such restriction, among both ends of the active portions P2 and P3 in the direction along the Y axis. Here, the correction signal DC drives the piezoelectric element 51*f* so that the diaphragm 51*e* is in an ideal natural state in a state where the discharge signal Com is not supplied to the piezoelectric element 51*f*. As a result, the driving efficiency of the piezoelectric element 51*f* can be enhanced. In addition, it is also possible to reduce variations in discharge characteristics when comparing the discharge characteristics in each of the discharge portions D.

As described above, the liquid discharge apparatus 100 is provided with the diaphragm 51*e*, the pressure chamber substrate 51*b*, the piezoelectric element 51*f*, and the drive signal generation circuit 24 which is an example of the "drive signal generation portion". The diaphragm 51*e* has a first surface F1 and a second surface F2 facing in the opposite direction to the first surface F1. The pressure chamber substrate 51*b* includes a partition wall 51*b*1 that is laminated on the first surface F1 and partitions the pressure chambers C communicating with the nozzles N discharging ink as an example of "liquid". The piezoelectric element 51*f* is laminated on the second surface F2 and includes the active portion P1 overlapping the center of the pressure chamber C when viewed in the thickness direction of the diaphragm 51*e*, and the active portions P2 and P3 overlapping the pressure chamber C at positions closer to the outer edge BD of the pressure chamber C than the active portion P1. The drive signal generation circuit 24 generates the discharge signal Com and the correction signal DC.

The discharge signal Com causes ink to be discharged from the nozzle N by being supplied to one of the active portion P1 and the active portions P2 and P3. The correction signal DC is supplied to the other of the active portion P1 and the active portions P2, P3. Here, during the discharge period T during which ink is discharged from the nozzles N, the potential of the discharge signal Com changes over time, and the potential of the correction signal DC is constant.

In the liquid discharge apparatus 100 described above, during the discharge period T, the tension of the diaphragm 51*e* can be appropriately adjusted by supplying the correction signal DC of a constant potential to the other of the active portion P1 and the active portions P2 and P3. Therefore, it is possible to reduce the influence of deterioration of the piezoelectric element 51*f*, manufacturing variations among the discharge portions D, and the like, on the discharge characteristics of the ink from the nozzles N. As a result, good discharge characteristics can be stably obtained. In addition, by employing a driving method using the discharge signal Com and the correction signal as described above as a method of driving the liquid discharge head 50, good discharge characteristics can be stably obtained.

In the present embodiment, as described above, the discharge signal Com is supplied to the active portion P1. On the other hand, the correction signal DC is supplied to the active portions P2 and P3. As a result, a stress acts so that the diaphragm 51*e* is displaced in the direction where each of the second surfaces F2 is recessed, that is, in the direction where the second surface F2 is projected as a whole, in the active portions P2 and P3, and the deflection of the diaphragm 51*e* in the direction where the first surface F1 is projected due to manufacturing errors or the like is alleviated. As a result, the driving efficiency of the piezoelectric element 51*f* can be suppressed from decreasing, and the influence of manufacturing variations among the discharge portions D can be reduced. In addition, since the active portions P2 and P3 are located at both ends of the pressure chamber C in the direction along the Y axis, the overall tension of the diaphragm 51*e* can be finely adjusted compared to the configuration in which the correction signal DC is supplied to the active portion P1. As a result, the reliability of the diaphragm 51*e* can be improved.

In addition, as described above, the liquid discharge apparatus 100 is provided with the discharge portion D_1 as an example of the "first discharge portion" and the discharge portion D_2 as an example of the "second discharge portion". Each of the discharge portion D_1 and the discharge portion D_2 includes the nozzle N, the pressure chamber C, the active portion P1, and the active portions P2 and P3. The potential of the correction signal DC used for the discharge portion D_1 is equal to the potential of the correction signal DC used for the discharge portion D_2. Therefore, the circuit configuration of the drive signal generation circuit 24 can be simplified compared to the configuration in which the correction signal DC is generated individually for each discharge portion D.

Furthermore, as described above, the amount of deflection of the diaphragm 51*e* in the state where the correction signal DC is supplied to one of the active portion P1 and the active portions P2 and P3 is smaller than the amount of deflection of the diaphragm 51*e* in a state where the correction signal DC is supplied to neither the active portion P1 nor the active portions P2 and P3. Therefore, the initial deflection of the diaphragm 51*e* can be reduced. As a result, the amount of deflection of the diaphragm 51*e* when ink is discharged from the nozzles N can be increased.

In addition, as described above, the liquid discharge apparatus 100 is further provided with the control circuit 21, which is an example of the "control portion". The control circuit 21 controls driving of the drive signal generation circuit 24. Here, by adjusting the correction signal DC by the control circuit 21, it is possible to optimize the discharge characteristics or improve the discharge characteristics.

Here, as described above, the control circuit 21 adjusts the correction signal DC based on the print data signal SI, which is an example of "droplet amount information". The print data signal SI is information on the amount of ink discharged from the nozzles N per one discharge. Therefore, ink droplets having different sizes from each other can be discharged from the nozzles N using a single waveform of the discharge signal Com.

In addition, as described above, during periods other than the discharge period T, power saving of the liquid discharge apparatus 100 can be achieved by lowering the potential of the correction signal DC or supplying the correction signal DC to neither the active portion P1 nor the active portions P2 and P3.

2. SECOND EMBODIMENT

Hereinafter, a second embodiment of the present disclosure will be described. Hereinafter, the description will focus on differences from the first embodiment.

Figure 12:
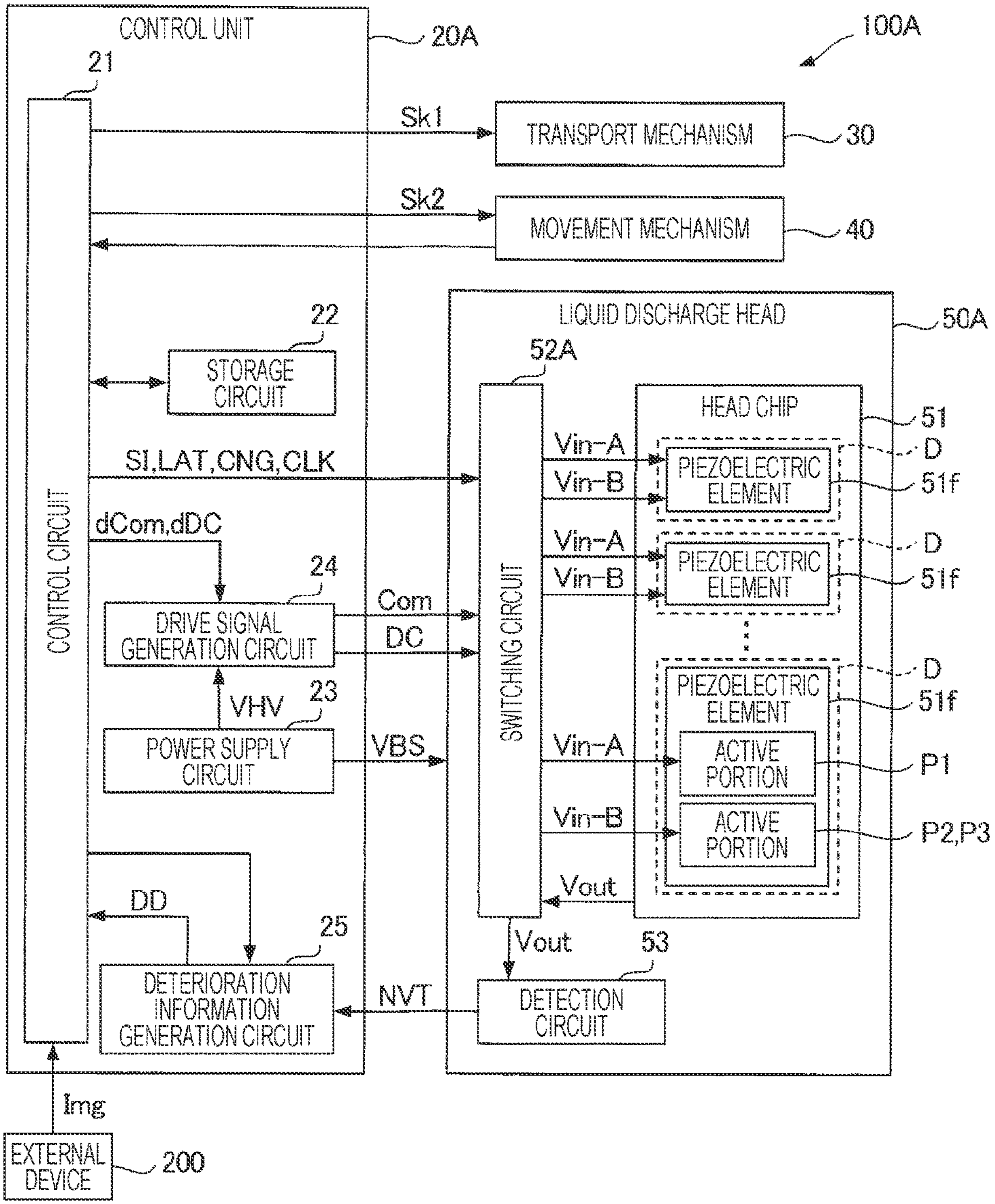
FIG. 12 is a diagram illustrating an electrical configuration of a liquid discharge apparatus according to a second embodiment.

FIG. 12 is a diagram illustrating an electrical configuration of the liquid discharge apparatus 100A according to the second embodiment. The liquid discharge apparatus 100A is configured in the same manner as the liquid discharge apparatus 100 of the first embodiment, except that a control unit 20A and a liquid discharge head 50A are provided instead of the control unit 20 and the liquid discharge head 50.

The control unit 20A is configured in the same manner as the control unit 20 described above, except that a deterioration information generation circuit 25 is added and the correction signal DC is adjusted accordingly. The deterioration information generation circuit 25 generates deterioration information DD. The deterioration information DD is information on deterioration of at least one of the nozzle plate 51*c* having the nozzle N, the pressure chamber substrate 51*b,* the diaphragm 51*e,* and the piezoelectric element 51*f.* Here, examples of deterioration include adhesion of foreign matter in the vicinity of the nozzle, increase in ink viscosity, entry of air bubbles into the pressure chamber, fatigue of the piezoelectric element and diaphragm, and the like.

The deterioration information generation circuit 25 measures the number of times the piezoelectric element 51*f* is driven or the period of use based on the print data signal SI and the like from the control circuit 21, and generates deterioration information DD based on the measurement result. In addition, in the present embodiment, the deterioration information generation circuit 25 generates the deterioration information DD based on the residual vibration signal NVT from the liquid discharge head 50A.

In the present embodiment, the control circuit 21 controls driving of the drive signal generation circuit 24 so as to adjust the correction signal DC based on the deterioration information DD. Specifically, the control circuit 21 adjusts the correction signal DC so that the higher the degree of deterioration indicated by the deterioration information DD, the higher the potential.

In addition, in the present embodiment, the control circuit 21 can execute a detection operation using a detection circuit 53 described later. This detection operation is performed by driving the active portion P1 of the piezoelectric element 51*f* by the discharge signal Com and detecting the output signal Vout due to the electromotive force of the active portions P2 and P3 of the piezoelectric element 51*f,* which is the residual vibration accompanying this driving by the detection circuit 53. Here, the waveform of the discharge signal Com is an example of the "detection waveform". The execution timing and the like of this detection operation are appropriately determined according to a program set in advance or an operation from the user. In addition, the discharge signal Com may include a detection waveform separately from the waveform described above.

The liquid discharge head 50A is configured in the same manner as the liquid discharge head 50 described above, except that a switching circuit 52A is provided instead of the switching circuit 52 and a detection circuit 53 is added.

The detection circuit 53 generates a residual vibration signal NVT based on the output signal Vout generated by the piezoelectric element 51*f.* For example, the detection circuit 53 generates the residual vibration signal NVT by amplifying the output signal Vout after removing noise. The residual vibration signal NVT indicates residual vibration, which is vibration remaining in the ink flow path in the head chip 51 after the piezoelectric element 51*f* is driven.

Figure 13:
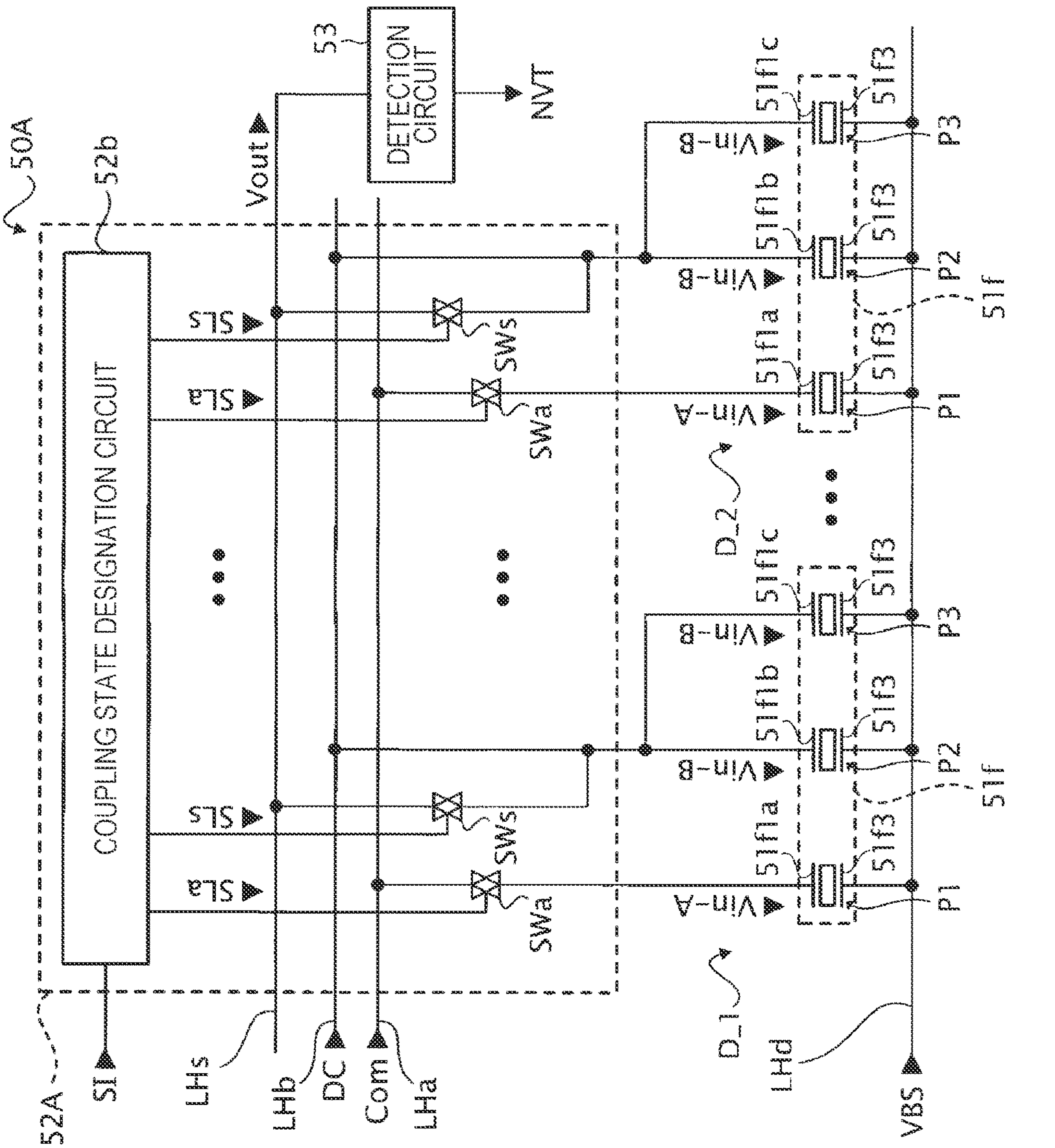
FIG. 13 is a diagram for describing a switching circuit according to the second embodiment.

FIG. 13 is a diagram for describing the switching circuit 52A according to the second embodiment. The switching circuit 52A is configured in the same manner as the switching circuit 52 described above, except that a coupling state designation circuit 52*b* is provided instead of the coupling state designation circuit 52*a* and a wiring LHs and a plurality of switches SWs are added.

As illustrated in FIG. 13, wirings LHd, LHa and LHs are coupled to the switching circuit 52A. The wiring LHs is a signal line that transmits the output signal Vout.

The switching circuit 52A includes a plurality of switches SWa and a plurality of switches SWs corresponding one-to-one with the plurality of piezoelectric elements 51*f,* and a coupling state designation circuit 52*b* that designates the coupling state of these switches.

The switch SWs is a switch that switches between conduction (on) and non-conduction (off) between the wiring LHs for transmitting the output signal Vout and the individual electrodes 51*f*1*b* and 51*f*1*c* of the piezoelectric element 51*f.* Each of these switches is, for example, a transmission gate.

The coupling state designation circuit 52*b* generates a coupling state designation signal SLa designating on/off of the plurality of switches SWa, and a coupling state designation signal SLs designating on/off of the plurality of switches SWs, based on the clock signal CLK, the print data signal SI, the latch signal LAT, and the change signal CNG supplied from the control circuit 21.

On/off of the switch SWa is switched according to the coupling state designation signal SLa generated as described above. In addition, on/off of the switch SWs is switched according to the coupling state designation signal SLs. As described above, the switching circuit 52A supplies the output signal Vout from one or more piezoelectric elements 51*f* selected from the plurality of piezoelectric elements 51*f* to the detection circuit 46.

According to the second embodiment described above, it is possible to stably obtain good discharge characteristics. In the present embodiment, as described above, the control circuit 21 adjusts the correction signal DC based on the deterioration information DD. The deterioration information DD is information on deterioration of at least one of the nozzle plate 51*c* having the nozzle N, the pressure chamber substrate 51*b,* the diaphragm 51*e,* and the piezoelectric element 51*f.* Therefore, it is possible to reduce fluctuations in discharge characteristics due to deterioration of at least one of the nozzle plate 51*c* having the nozzles N, the pressure chamber substrate 51*b*, the diaphragm 51*e*, and the piezoelectric element 51*f*.

In addition, the liquid discharge apparatus 100A is further provided with the detection circuit 53 as described above. The drive signal generation circuit 24 generates a discharge signal Com as an inspection signal to be supplied to one of the active portion P1 and the active portions P2 and P3. The detection circuit 53 detects, as an output signal Vout, an electromotive force generated in the other of the active portion P1 and the active portions P2 and P3 by supplying the discharge signal Com to one of the active portion P1 and the active portions P2 and P3. Therefore, it is possible to improve the inspection accuracy and shorten the inspection time as compared to a configuration in which one active portion performs both the driving by the inspection signal and the output of the electromotive force resulting from the driving.

3. THIRD EMBODIMENT

Hereinafter, a third embodiment of the present disclosure will be described. Hereinafter, the description will focus on differences from the first embodiment.

Figure 14:
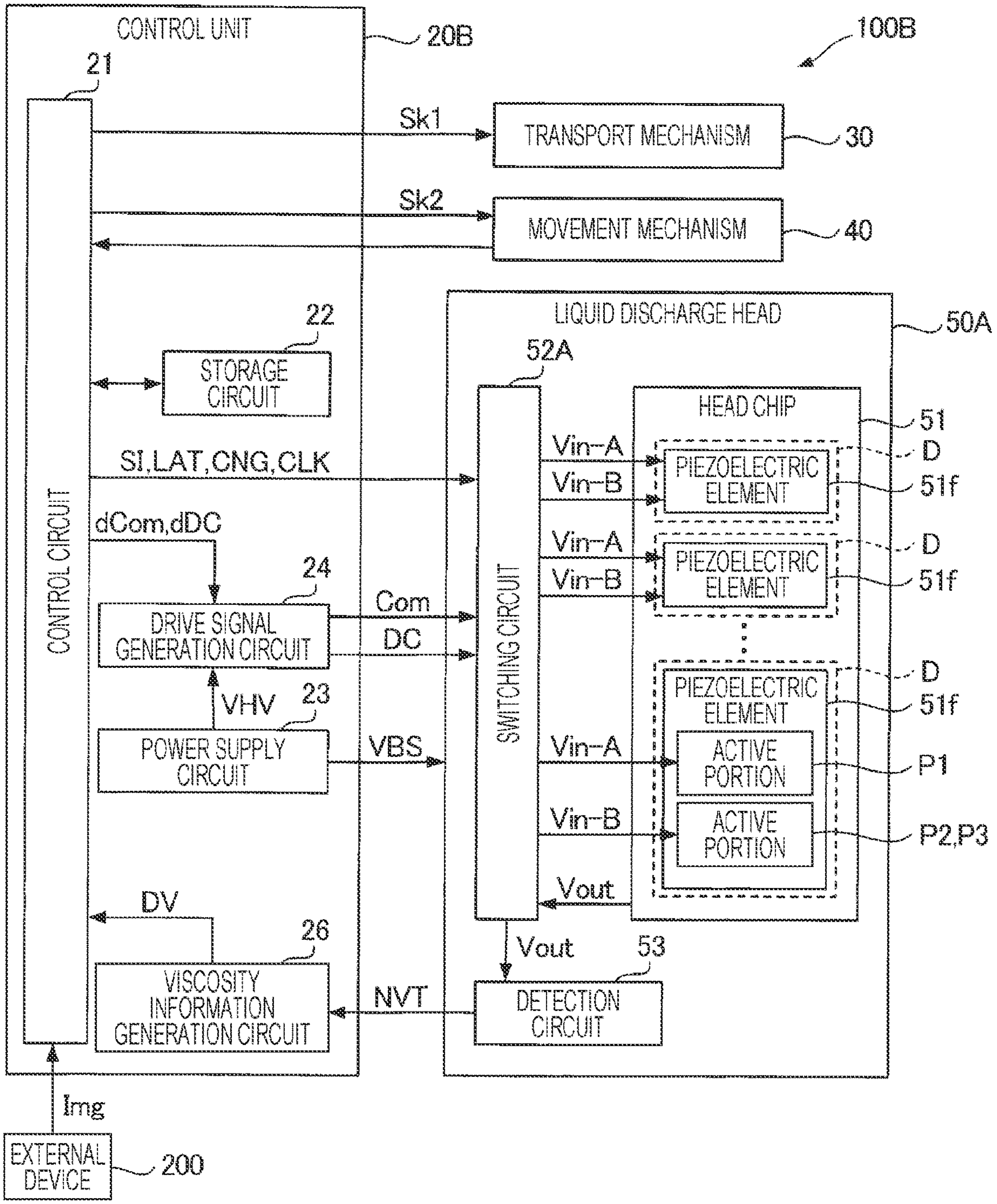
FIG. 14 is a diagram illustrating an electrical configuration of a liquid discharge apparatus according to a third embodiment.

FIG. 14 is a diagram illustrating an electrical configuration of the liquid discharge apparatus 100B according to the third embodiment. The liquid discharge apparatus 100B is configured in the same manner as the liquid discharge apparatus 100 of the first embodiment, except that a control unit 20B and a liquid discharge head 50A are provided instead of the control unit 20 and the liquid discharge head 50. That is, the liquid discharge apparatus 100B is configured in the same manner as the liquid discharge apparatus 100A of the second embodiment described above, except that a control unit 20B is provided instead of the control unit 20A.

The control unit 20B is configured in the same manner as the control unit 20A described above, except that a viscosity information generation circuit 26 is provided in place of the deterioration information generation circuit 25 and a method of adjusting the correction signal DC is different accordingly. A viscosity information generation circuit 26 generates viscosity information DV. The viscosity information DV is information on the viscosity of the ink discharged from the nozzles N.

The viscosity information generation circuit 26 generates viscosity information DV based on the residual vibration signal NVT from the liquid discharge head 50A.

In the present embodiment, the control circuit 21 controls driving of the drive signal generation circuit 24 so as to adjust the correction signal DC based on the viscosity information DV. Specifically, the control circuit 21 adjusts the correction signal DC so that the higher the viscosity indicated by the viscosity information DV, the higher the potential.

According to the third embodiment described above, it is possible to stably obtain good discharge characteristics. In the present embodiment, as described above, the control circuit 21 adjusts the correction signal DC based on the viscosity information DV on the viscosity of the ink discharged from the nozzles N. Therefore, it is possible to reduce fluctuations in discharge characteristics due to changes in the viscosity of the ink discharged from the nozzles N.

4. FOURTH EMBODIMENT

Hereinafter, a fourth embodiment of the present disclosure will be described. Hereinafter, the description will focus on differences from the first embodiment.

Figure 15:
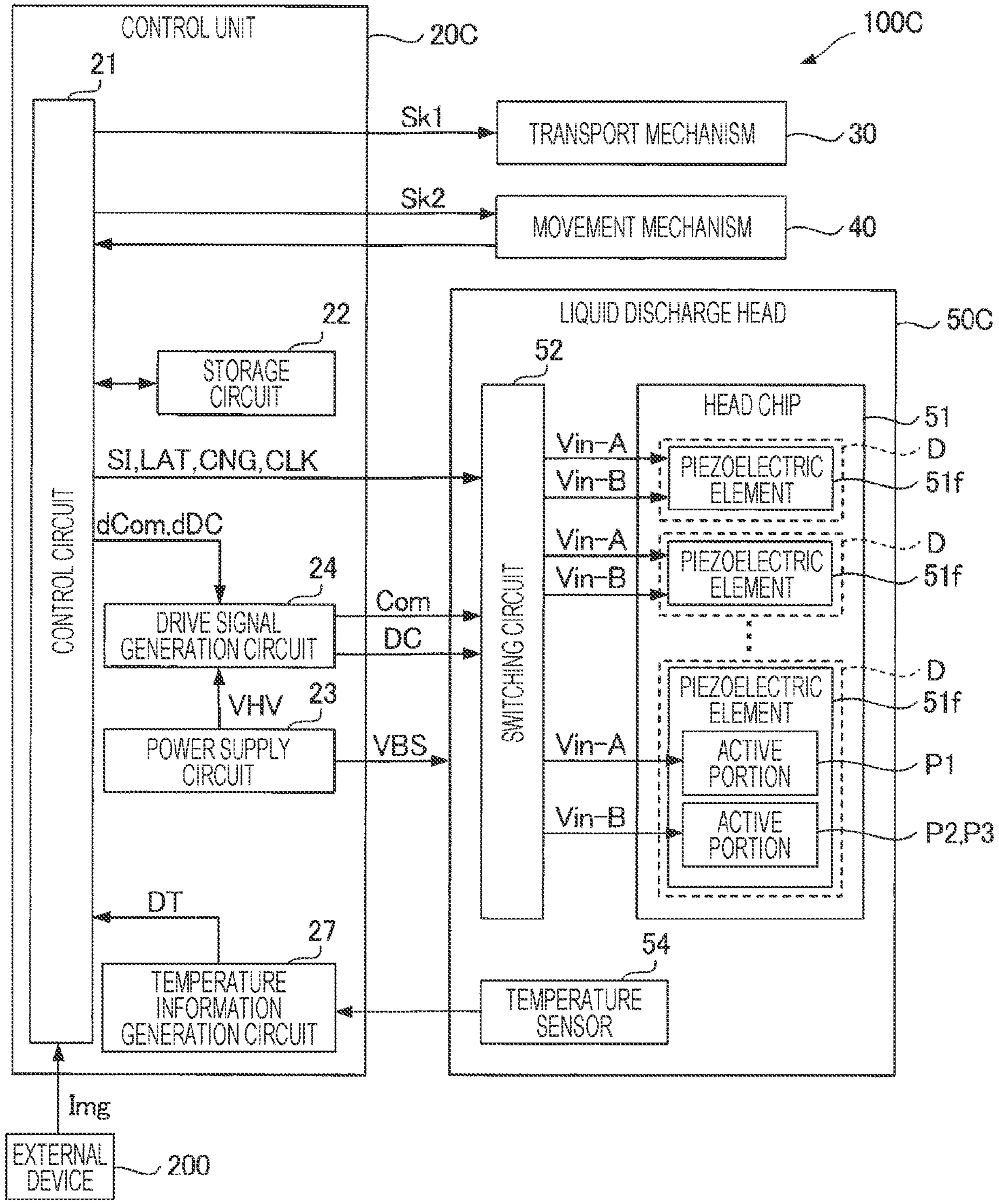
FIG. 15 is a diagram illustrating an electrical configuration of a liquid discharge apparatus according to a fourth embodiment.

FIG. 15 is a diagram illustrating an electrical configuration of the liquid discharge apparatus 100C according to the fourth embodiment. The liquid discharge apparatus 100C is configured in the same manner as the liquid discharge apparatus 100 of the first embodiment described above, except that a control unit 20C and a liquid discharge head 50C are provided instead of the control unit 20 and the liquid discharge head 50.

The control unit 20C is configured in the same manner as the control unit 20 described above, except that a temperature information generation circuit 27 is added and the correction signal DC is adjusted accordingly. The temperature information generation circuit 27 generates temperature information DT. The temperature information DT is information on the temperature of the ink discharged from the nozzles N.

The temperature information generation circuit 27 generates temperature information DT based on the output from a temperature sensor 54 described later.

In the present embodiment, the control circuit 21 controls driving of the drive signal generation circuit 24 so as to adjust the correction signal DC based on the temperature information DT. Specifically, the control circuit 21 adjusts the correction signal DC so that the lower the temperature indicated by the temperature information DT, the higher the potential.

The liquid discharge head 50C is configured in the same manner as the liquid discharge head 50 described above, except that the temperature sensor 54 is added. The temperature sensor 54 is an element such as a thermistor that detects the temperature of the ink discharged from the nozzles N. For example, the temperature sensor 54 is installed inside the head chip 51.

According to the fourth embodiment described above, it is possible to stably obtain good discharge characteristics. In the present embodiment, as described above, the control circuit 21 adjusts the correction signal DC based on the temperature information DT on the temperature of the ink discharged from the nozzles N. Therefore, it is possible to reduce fluctuations in discharge characteristics due to changes in the temperature of the ink discharged from the nozzles N.

5. FIFTH EMBODIMENT

Hereinafter, a fifth embodiment of the present disclosure will be described. Hereinafter, the description will focus on differences from the first embodiment.

Figure 16:
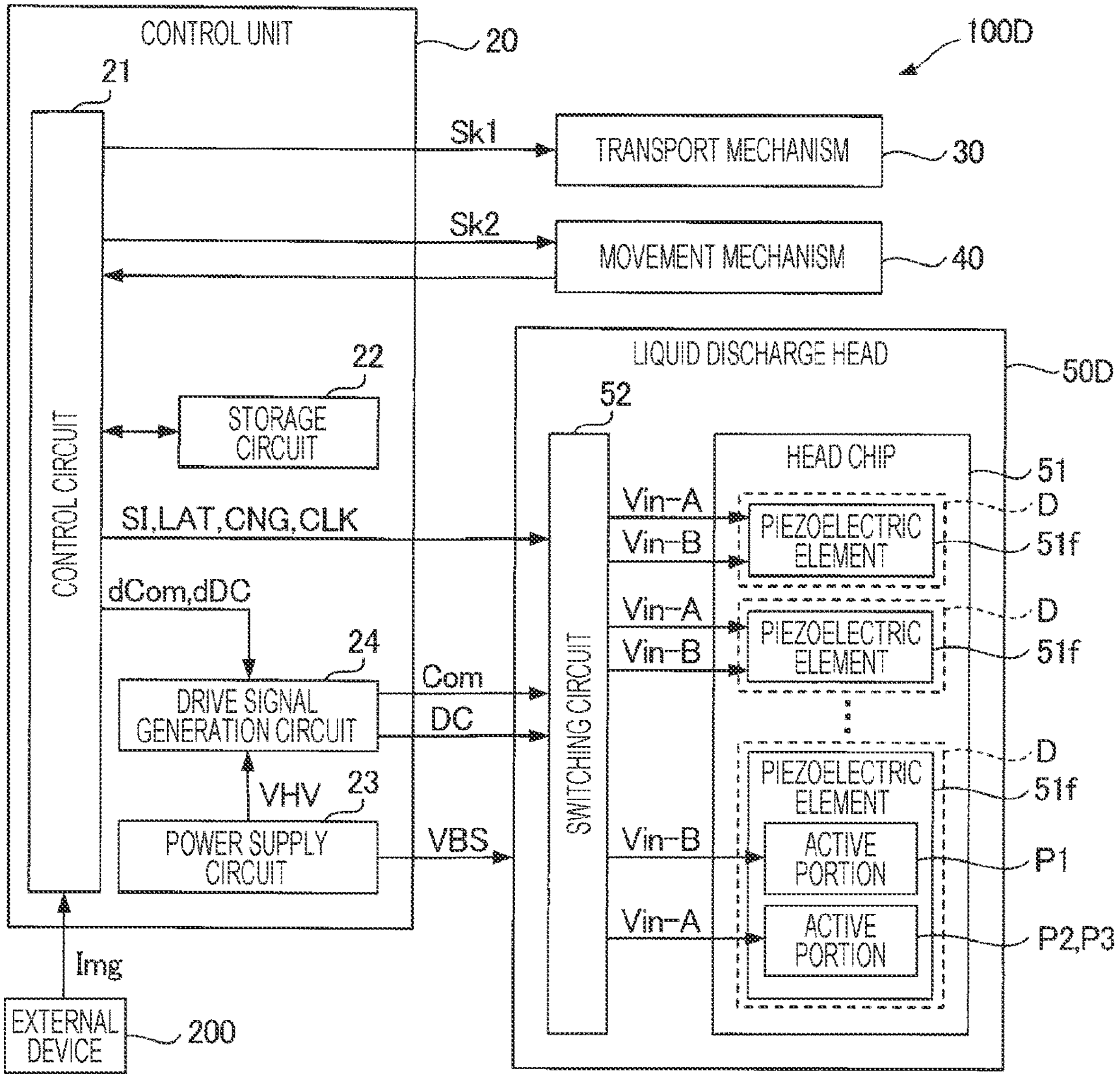
FIG. 16 is a diagram illustrating an electrical configuration of a liquid discharge apparatus according to a fifth embodiment.

FIG. 16 is a diagram illustrating an electrical configuration of the liquid discharge apparatus 100D according to the fifth embodiment. The liquid discharge apparatus 100D is configured in the same manner as the liquid discharge apparatus 100 of the first embodiment, except that the discharge signal Com is supplied to the active portions P2 and P3 and the correction signal DC is supplied to the active portion P1.

According to the fifth embodiment described above, it is possible to stably obtain good discharge characteristics. In the present embodiment, as described above, the discharge signal Com is supplied to the active portions P2 and P3, and the correction signal DC is supplied to the active portion Pl. Therefore, the displacement amount of the diaphragm 51*e* can be easily increased compared to the configuration in which the discharge signal Com is supplied to the active portion P1. As a result, the discharge efficiency of the ink from the nozzles N can be improved.

6. SIXTH EMBODIMENT

Hereinafter, a sixth embodiment of the present disclosure will be described. Hereinafter, the description will focus on differences from the first embodiment.

Figure 17:
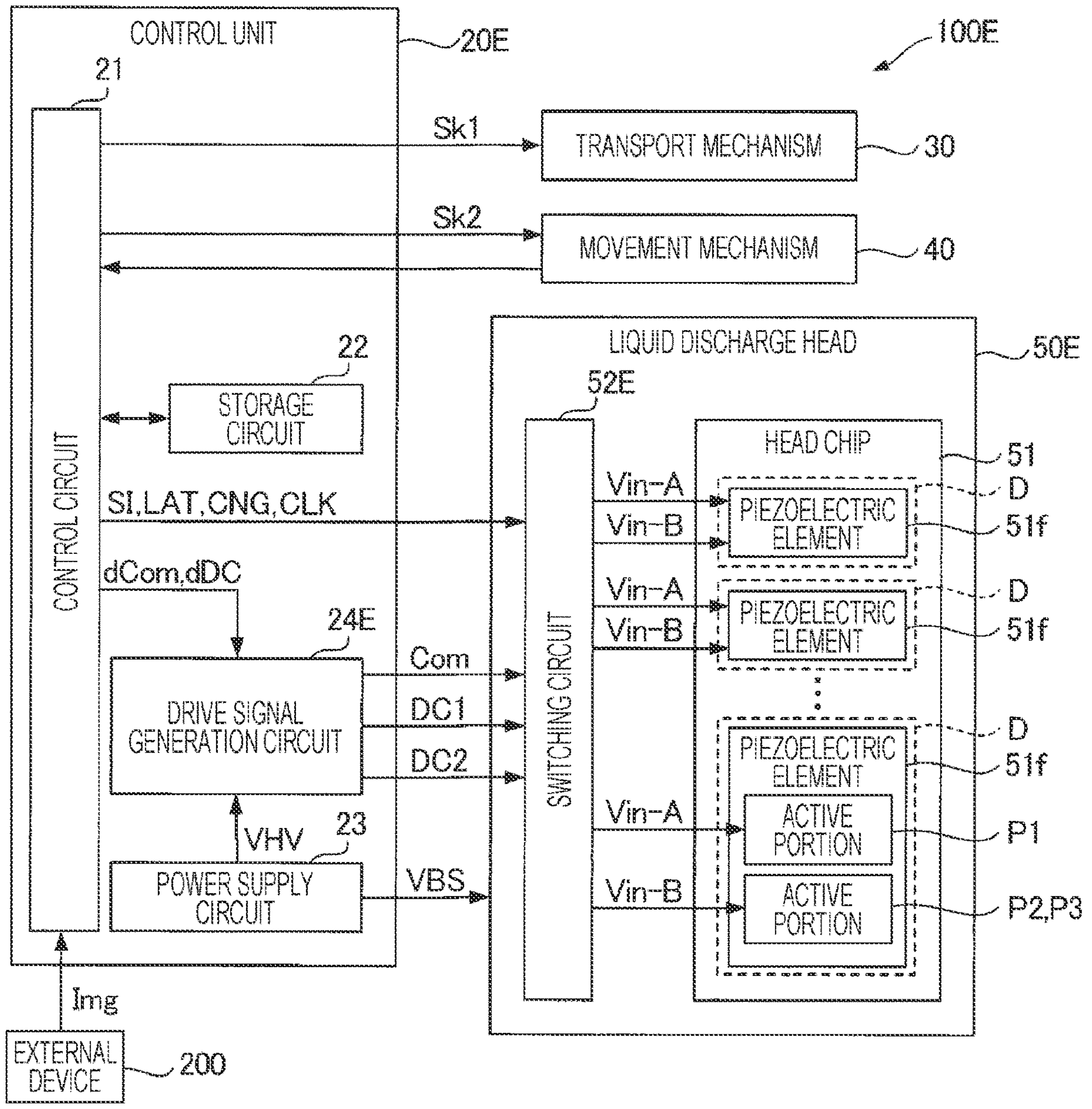
FIG. 17 is a diagram illustrating an electrical configuration of a liquid discharge apparatus according to a sixth embodiment.

FIG. 17 is a diagram illustrating an electrical configuration of the liquid discharge apparatus 100E according to the sixth embodiment. The liquid discharge apparatus 100E is configured in the same manner as the liquid discharge apparatus 100 of the first embodiment described above, except that a control unit 20E and a liquid discharge head 50E are provided instead of the control unit 20 and the liquid discharge head 50.

The control unit 20E is configured in the same manner as the control unit 20 described above, except that a drive signal generation circuit 24E is provided instead of the drive signal generation circuit 24. The drive signal generation circuit 24E is an example of a "drive signal generation portion" and generates a correction signal DC1 and a correction signal DC2 based on the voltage designation signal dDC. Each of the correction signal DC1 and the correction signal DC2 is a constant potential signal. However, the potentials of the correction signal DC1 and the correction signal DC2 are different from each other. In the present embodiment, the control circuit 21 generates a signal for selecting either the correction signal DC1 or the correction signal DC2. This signal may be generated independently or may be included in the print data signal SI or the like.

The liquid discharge head 50E is configured in the same manner as the liquid discharge head 50 described above, except that a switching circuit 52E is provided instead of the switching circuit 52. Under the control of the control unit 20E, the switching circuit 52E switches whether or not to supply a discharge signal Com output from the control unit 20E to the active portion P1 as the supply signal Vin-A to each of the plurality of piezoelectric elements 51*f*. In addition, the switching circuit 52E selects one of the correction signal DC1 and the correction signal DC2 based on the print data signal SI or the like, and supplies the correction signal as the supply signal Vin-B to the active portions P2 and P3 of the piezoelectric elements 51*f*.

This selection is not particularly limited and may be random, but is determined according to, for example, variations in the discharge characteristics of the plurality of discharge portions D. In addition, this selection may be made based on the deterioration information DD, the viscosity information DV, or the temperature information DT described above.

Figure 18:
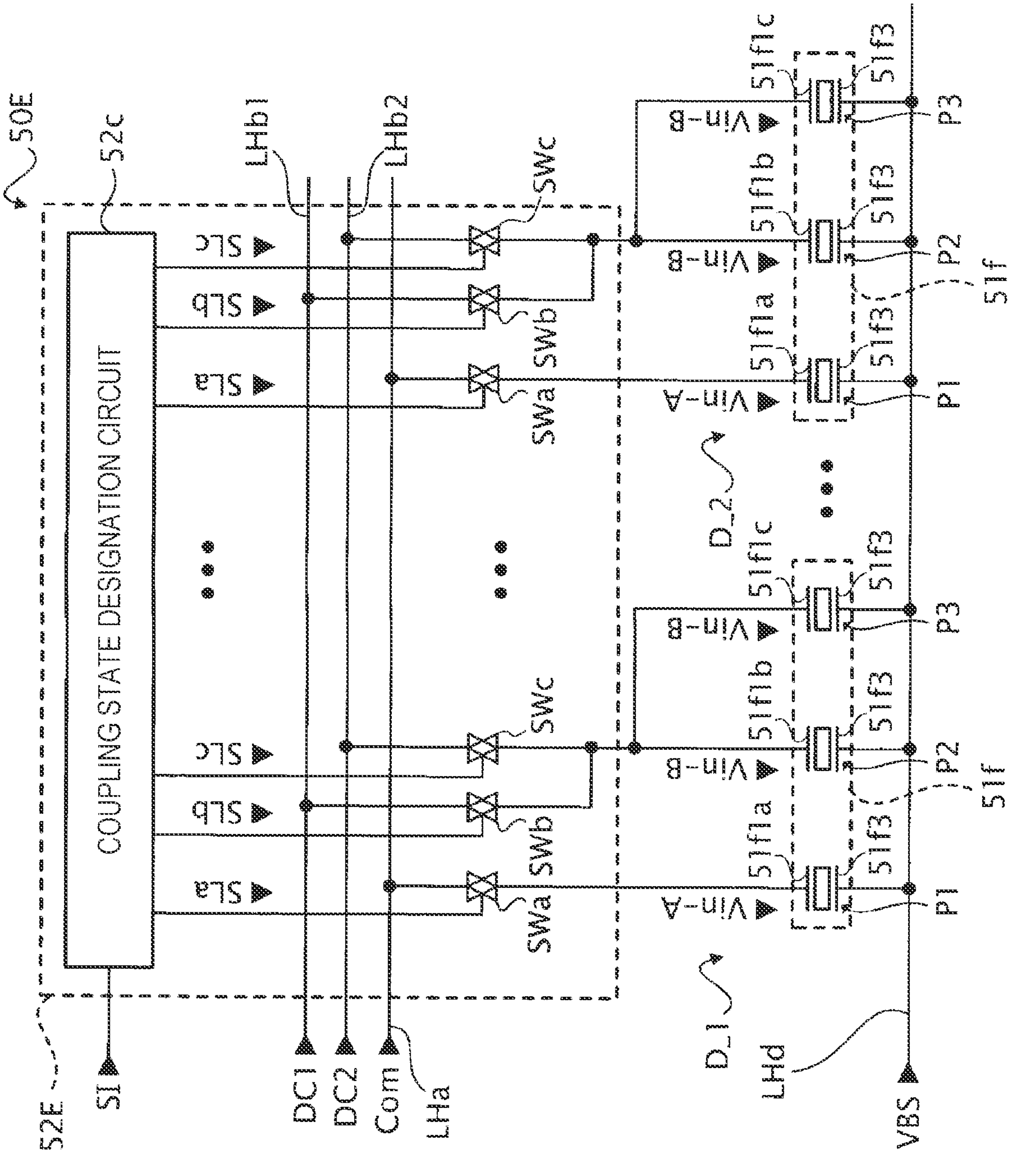
FIG. 18 is a diagram for describing a switching circuit in the sixth embodiment.

FIG. 18 is a diagram for describing the switching circuit 52E in the sixth embodiment. The switching circuit 52E is configured in the same manner as the switching circuit 52 described above, except that a coupling state designation circuit 52*c* and wirings LHb1 and LHb2 are provided instead of the coupling state designation circuit 52*a* and the wiring LHb, and a plurality of switches SWb and a plurality of switches SWc are added.

As illustrated in FIG. 18, the wirings LHd, LHa, LHb1, and LHb2 are coupled to the switching circuit 52E. The wiring LHb1 is a signal line that transmits the correction signal DC1. The wiring LHb2 is a signal line that transmits the correction signal DC2.

The switching circuit 52E includes a plurality of switches SWa, a plurality of switches SWb, and a plurality of switches SWc corresponding one-to-one with the plurality of piezoelectric elements 51*f*, and a coupling state designation circuit 52*c* that designates the coupling state of these switches.

The switch SWb is a switch that switches between conduction (on) and non-conduction (off) between the wiring LHb1 and the individual electrodes 51*f*1*b* and 51*f*1*c* of the piezoelectric element 51*f*. The switch SWc is a switch that switches between conduction (ON) and non-conduction (OFF) between the wiring LHb2 and the individual electrodes 51*f*1*b* and 51*f*1*c* of the piezoelectric element 51*f*. Each of these switches is, for example, a transmission gate.

The coupling state designation circuit 52*c* generates a coupling state designation signal SLa designating on/off of the plurality of switches SWa, a coupling state designation signal SLb designating on/off of the plurality of switches SWb, and a coupling state designation signal SLc designating on/off of the plurality of switches SWc, based on the signal from the control circuit 21. Here, in the same discharge portion D, when one of the switch SWb and the switch SWc is on, the other is off.

On/off of the switch SWa is switched according to the coupling state designation signal SLa generated as described above. On/off of the switch SWb is switched according to the coupling state designation signal SLb.

On/off of the switch SWc is switched according to the coupling state designation signal SLc. As described above, the switching circuit 52E can change the potentials of the individual electrodes 51*f*1*b* and 51*f*1*c*. In addition, it is also possible to use the correction signal DC1 for one of the discharge portions D_1 and D_2 and the correction signal DC2 for the other.

According to the sixth embodiment described above, it is possible to stably obtain good discharge characteristics. In the present embodiment, as described above, the liquid discharge apparatus 100E is provided with a plurality of discharge portions D that discharge ink. Each of the plurality of discharge portions D includes the nozzle N, the pressure chamber C, the active portion P1, and the active portions P2 and P3. It is also possible to use the correction signal DC1 for one of the discharge portions D_1 and D_2 and the correction signal DC2 for the other. Here, the potential of the correction signal DC1 is different from the potential of the correction signal DC2. Therefore, the tension of the diaphragm 51*e* can be adjusted individually for each discharge portion D.

7. Modification Example

Each embodiment in the above illustration can be variously modified. Specific modification aspects that can be applied to each of the above-described embodiments are exemplified below. Two or more aspects randomly selected from the following examples can be appropriately merged to the extent that these aspects do not contradict each other.

7-1. Modification Example 1

Although the configuration in which the piezoelectric layer is interposed between the individual electrodes and the common electrode is exemplified in the above embodiment, the present disclosure is not limited thereto, and a configuration in which a piezoelectric layer is interposed between the individual electrodes may be used. In addition, the first electrode layer 51*f*1 may be used as a common electrode, and the second electrode layer 52*f*3 may be used as an individual electrode.

7-2. Modification Example 2

Although the serial-type liquid discharge apparatus 100 in which the carriage 41 on which the liquid discharge head 50 is mounted is reciprocated is exemplified in each of the above-described embodiments, the present disclosure can also be applied to a line-type liquid discharge apparatus in which a plurality of nozzles N are distributed over the entire width of the medium M.

7-3. Modification Example 3

The liquid discharge apparatus 100 exemplified in each of the above-described embodiments can be employed in various types of equipment such as facsimile machines and copiers, in addition to equipment dedicated to printing. However, the application of the liquid discharge apparatus of the present disclosure is not limited to printing. For example, a liquid discharge apparatus that discharges a solution of a coloring material is used as a manufacturing apparatus for forming a color filter of a liquid crystal display device. In addition, a liquid discharge apparatus for discharging a solution of a conductive material is used as a manufacturing apparatus for forming wiring and electrodes on a wiring substrate.

What is claimed is:

1. A liquid discharge apparatus comprising:

a diaphragm that has a first surface and a second surface facing in a direction opposite to the first surface;

a pressure chamber substrate laminated on the first surface and including a partition wall partitioning a pressure chamber communicating with a nozzle discharging liquid;

a piezoelectric element laminated on the second surface and including a first active portion that overlaps a center of the pressure chamber when viewed in a thickness direction of the diaphragm and a second active portion that overlaps the pressure chamber at a position closer to an outer edge of the pressure chamber than the first active portion; and a drive signal generation portion that generates a discharge signal for discharging the liquid from the nozzle by being supplied to one of the first active portion and the second active portion and a correction signal that is supplied to the other of the first active portion and the second active portion, wherein a potential of the discharge signal changes over time and a potential of the correction signal is constant during a discharge period for discharging the liquid from the nozzle.

2. The liquid discharge apparatus according to claim 1, wherein the discharge signal is supplied to the first active portion, and the correction signal is supplied to the second active portion.

3. The liquid discharge apparatus according to claim 1, wherein the discharge signal is supplied to the second active portion, and the correction signal is supplied to the first active portion.

4. The liquid discharge apparatus according to claim 1, further comprising:

a first discharge portion; and a second discharge portion, wherein the first discharge portion and the second discharge portion include the nozzle, the pressure chamber, the first active portion, and the second active portion, respectively, and a potential of the correction signal used for the first discharge portion is different from a potential of the correction signal used for the second discharge portion.

5. The liquid discharge apparatus according to claim 1, further comprising:

a first discharge portion; and a second discharge portion, wherein the first discharge portion and the second discharge portion include the nozzle, the pressure chamber, the first active portion, and the second active portion, respectively, and a potential of the correction signal used for the first discharge portion is equal to a potential of the correction signal used for the second discharge portion.

6. The liquid discharge apparatus according to claim 1, wherein an amount of deflection of the diaphragm in a state where the correction signal is supplied to one of the first active portion and the second active portion is smaller than an amount of deflection of the diaphragm in a state where the correction signal is supplied to neither the first active portion nor the second active portion.

7. The liquid discharge apparatus according to claim 1, further comprising:

a control portion that controls driving of the drive signal generation portion, wherein the control portion adjusts the correction signal.

8. The liquid discharge apparatus according to claim 7, wherein the control portion adjusts the correction signal based on deterioration information on deterioration of at least one of a nozzle plate having the nozzle, the pressure chamber substrate, the diaphragm, and the piezoelectric element.

9. The liquid discharge apparatus according to claim 7, wherein the control portion adjusts the correction signal based on viscosity information on a viscosity of the liquid discharged from the nozzle.

10. The liquid discharge apparatus according to claim 7, wherein the control portion adjusts the correction signal based on temperature information on a temperature of the liquid discharged from the nozzle.

11. The liquid discharge apparatus according to claim 7, wherein the control portion adjusts the correction signal based on droplet amount information on an amount of the liquid discharged from the nozzle per one discharge.

12. The liquid discharge apparatus according to claim 1, wherein during a period other than the discharge period, the potential of the correction signal is lowered, or the correction signal is supplied to neither the first active portion nor the second active portion.

13. The liquid discharge apparatus according to claim 1, further comprising:

a detection circuit, wherein the drive signal generation portion generates an inspection signal to be supplied to one of the first active portion and the second active portion, and the detection circuit detects an electromotive force generated in one of the first active portion and the second active portion by supplying the inspection signal to the other of the first active portion and the second active portion.

14. A liquid discharge apparatus comprising:

a diaphragm that has a first surface and a second surface facing in a direction opposite to the first surface;

a pressure chamber substrate laminated on the first surface and including a partition wall partitioning a pressure chamber communicating with a nozzle for discharging liquid;

a piezoelectric element laminated on the second surface and including a first active portion that overlaps a center of the pressure chamber when viewed in a thickness direction of the diaphragm and a second active portion that overlaps the pressure chamber at a position closer to an outer edge of the pressure chamber than the first active portion, the method comprising:

supplying a discharge signal for discharging the liquid from the nozzle to one of the first active portion and the second active portion and supplying a correction signal to the other of the first active portion and the second active portion, and changing a potential of the discharge signal over time, and maintaining a potential of the correction signal constant during a discharge period for discharging the liquid from the nozzle.

* * * * *